(12) United States Patent
Hwang et al.

(10) Patent No.: US 12,401,478 B2
(45) Date of Patent: Aug. 26, 2025

(54) METHOD AND DEVICE FOR TRANSMITTING AND RECEIVING SOUNDING REFERENCE SIGNALS IN WIRELESS COMMUNICATION SYSTEM

(71) Applicant: LG ELECTRONICS INC., Seoul (KR)

(72) Inventors: Seunggye Hwang, Seoul (KR); Youngdae Lee, Seoul (KR); Jaehyung Kim, Seoul (KR); Suckchel Yang, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/918,864

(22) PCT Filed: Sep. 6, 2022

(86) PCT No.: PCT/KR2022/013318
§ 371 (c)(1),
(2) Date: Oct. 13, 2022

(87) PCT Pub. No.: WO2023/136423
PCT Pub. Date: Jul. 20, 2023

(65) Prior Publication Data
US 2024/0223334 A1    Jul. 4, 2024

(30) Foreign Application Priority Data
Jan. 11, 2022 (KR) .......... 10-2022-0004151
Feb. 11, 2022 (KR) .......... 10-2022-0018464

(51) Int. Cl.
*H04L 5/00* (2006.01)
*H04W 72/0446* (2023.01)
*H04W 72/232* (2023.01)

(52) U.S. Cl.
CPC ......... *H04L 5/0051* (2013.01); *H04W 72/232* (2023.01); *H04W 72/0446* (2013.01)

(58) Field of Classification Search
CPC .............. H04L 5/0051; H04W 72/232; H04W 72/0446

(Continued)

(56) References Cited

U.S. PATENT DOCUMENTS

2021/0136532 A1* 5/2021 Liu .................. H04W 4/06
2021/0288773 A1* 9/2021 Lin .................. H04W 56/001

FOREIGN PATENT DOCUMENTS

KR    10-2021-0119791 A    10/2021

OTHER PUBLICATIONS

Moderator (Samsung), "Summary for TRS/CSI-RS occasion(s) for idle/inactive UEs", 3GPP TSG RAN WG1 #104b-e e-Meeting, Apr. 12-Apr. 20, 2021, R1-2103251, p. 1-p. 24.

(Continued)

*Primary Examiner* — Hermon Asres
(74) *Attorney, Agent, or Firm* — BRYAN CAVE LEIGHTON PAISNER LLP

(57) ABSTRACT

According to at least one of embodiments disclosed in the present specification, a user equipment may receive one or more Tracking Reference Signal (TRS) configurations for a Radio Resource Control (RRC) inactive mode or an RRC idle mode, receive a Physical Downlink Control Channel (PDCCH) carrying Downlink Control Information (DCI) in the RRC inactive mode or the RRC idle mode, and determine a TRS availability related to a specific TRS configuration among the one or more TRS configurations.

15 Claims, 34 Drawing Sheets

(58) Field of Classification Search
USPC .......................................................... 370/329
See application file for complete search history.

(56) References Cited

OTHER PUBLICATIONS

Moderator (Samsung), "Summary for TRS/CSI-RS occasion(s) for idle/inactive UEs", 3GPP TSG RAN WG1 #104b-e e-Meeting, Apr. 12-Apr. 20, 2021, R1-2104115, p. 1-p. 69.

* cited by examiner

METHOD AND DEVICE FOR TRANSMITTING AND RECEIVING SOUNDING REFERENCE SIGNALS IN WIRELESS COMMUNICATION SYSTEM

CROSS-REFERENCE TO RELATED APPLICATIONS

This application claims the benefit of earlier filing date and right of priority to Korean Application No. PCT/KR2022/013318, filed on Sep. 6, 2022, which claims benefit of Korean Patent Application No. 10-2022-0018464 filed, Feb. 11, 2022, and Korean Patent Application No. 10-2022-0004151 filed, Jan. 11, 2022 the contents of which are all here by incorporated by reference herein in their entirety.

TECHNICAL FIELD

The present disclosure relates to a wireless communication system, and more particularly, to a method and apparatus for transmitting and receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

TECHNICAL SOLUTIONS

In one technical aspect of the present disclosure, provided is a method of receiving a signal by a user equipment in a wireless communication system, the method including receiving one or more Tracking Reference Signal (TRS) configurations for a Radio Resource Control (RRC) inactive mode or an RRC idle mode, receiving a Physical Downlink Control Channel (PDCCH) carrying Downlink Control Information (DCI) in the RRC inactive mode or the RRC idle mode, and determining a TRS availability related to a specific TRS configuration among the one or more TRS configurations, wherein each of the one or more TRS configurations may be received in each modification period related to a system information update, wherein the DCI may be paging-DCI for scheduling a paging message or Paging Early Indication-DCI (PEI-DCI) for early indicating whether a monitoring of the paging-DCI is required for the user equipment in a corresponding PO and include a field indicating a TRS availability, and wherein the user equipment may determine a time interval where the field indicating the TRS availability to be applied and the specific TRS configuration among the one or more TRS configurations based on a time resource in which the PDCCH carrying the DCI is received.

Based on that the time resource in which the PDCCH carrying the DCI is received belongs to a first modification period, the user equipment may determine a first TRS configuration associated with the first modification period as the specific TRS configuration. The user equipment may assume that a TRS related to the first TRS configuration is available during the time interval where the field indicating the TRS availability to be applied. Although at least a part of the time interval belongs to a second modification period subsequent to the first modification period, the user equipment may assume that the TRS related to the first TRS configuration is available for the entire time interval where the field indicating the TRS availability to be applied. Although the second modification period is associated with the second TRS configuration different from the first TRS configuration, the user equipment may assume that the TRS related to the first TRS configuration is available for the entire time interval to which the field indicating the TRS configuration will be applied.

When the time interval where the field indicating the TRS availability to be applied and the time resource having the PDCCH received therein belong to a same modification period, while a corresponding TRS configuration associated with the same modification period is not received by the user equipment yet, the user equipment may defer an application of the TRS availability indicated by the DCI until the corresponding TRS configuration is received. After completing an update of system information including the corresponding TRS configuration in the same modification period, the user equipment may start the application of the TRS availability indicated by the DCI.

Based on receiving information indicating to update the system information, the user equipment may complete the system information update including the TRS configuration in a corresponding modification period in which the information indicating to update the system information is received.

The PDCCH may be received based on at least one of Radio Network Temporary Identifiers configured for the user equipment and wherein the at least one RNTI includes a Paging-RNTI (P-RNTI).

In another technical aspect of the present disclosure, provided is a processor-readable recording medium including a program recorded therein to perform the signal receiving method described above.

In another technical aspect of the present disclosure, provided is a user equipment performing the signal receiving method described above.

In another technical aspect of the present disclosure, provided is a device for controlling a user equipment performing the signal receiving method described above.

In further technical aspect of the present disclosure, provided is a method of transmitting a signal by a base station in a wireless communication system, the method including transmitting one or more Tracking Reference Signal (TRS) configurations for a Radio Resource Control (RRC) inactive mode or an RRC idle mode of a user equipment and transmitting a Physical Downlink Control Channel (PDCCH) carrying Downlink Control Information (DCI) in the RRC inactive mode or the RRC idle mode of the user equipment, wherein each of the one or more TRS configurations may be transmitted in each modification period related to a system information update, wherein the DCI may be paging-DCI for scheduling a paging message or Paging Early Indication-DCI (PEI-DCI) for early indicating whether a monitoring of the paging-DCI is required for the user equipment in a corresponding PO and include a field indicating a TRS availability related to a specific TRS configuration among the one or more TRS configurations, and wherein a time interval where the field indicating the TRS availability to be applied and the specific TRS configuration among the one or more TRS configurations may be determined based on a time resource in which the PDCCH carrying the DCI is transmitted.

In another further technical aspect of the present disclosure, provided is a base station performing the signal transmitting method described above.

Advantageous Effects

According to one embodiment of the present disclosure, TRS/CSI-RS for an RRC idle/inactive mode UE may be transmitted and received more accurately and efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

MODE FOR INVENTION

Figure 1:
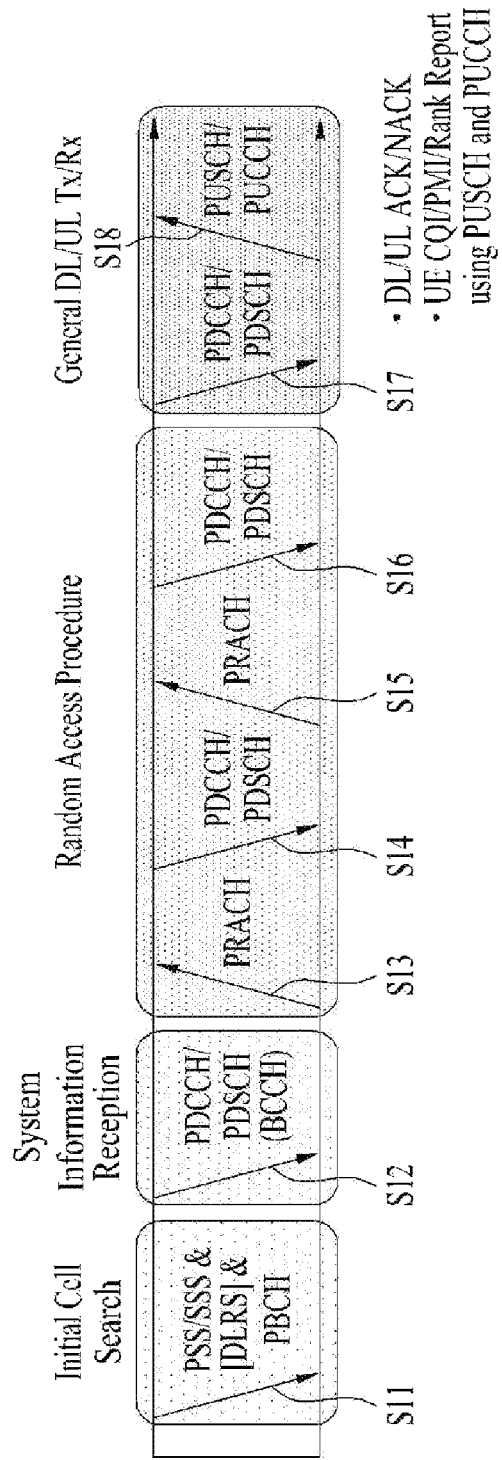
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE

TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)

3GPP NR

TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification TS 37.213: Introduction of channel access procedures to unlicensed spectrum for NR-based access Terms and Abbreviations PSS: Primary Synchronization Signal
SSS: Secondary Synchronization Signal
CRS: Cell reference signal
CSI-RS: Channel State Information Reference Signal
TRS: Tracking Reference Signal
SS: Search Space
CSS: Common Search Space
USS: UE-specific Search Space
PDCCH: Physical Downlink Control Channel; The PDCCH is used to represent PDCCHs of various structures which may be used for the same purpose in the following description.
PO: Paging Occasion
SI: System Information
RE: Resource Element
VRB: Virtual Resource Block
PRB: Physical Resource Block
RS: Reference Signal
TRS: Tracking Reference Signal
CSI-RS: Channel-State Information Reference Signal In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
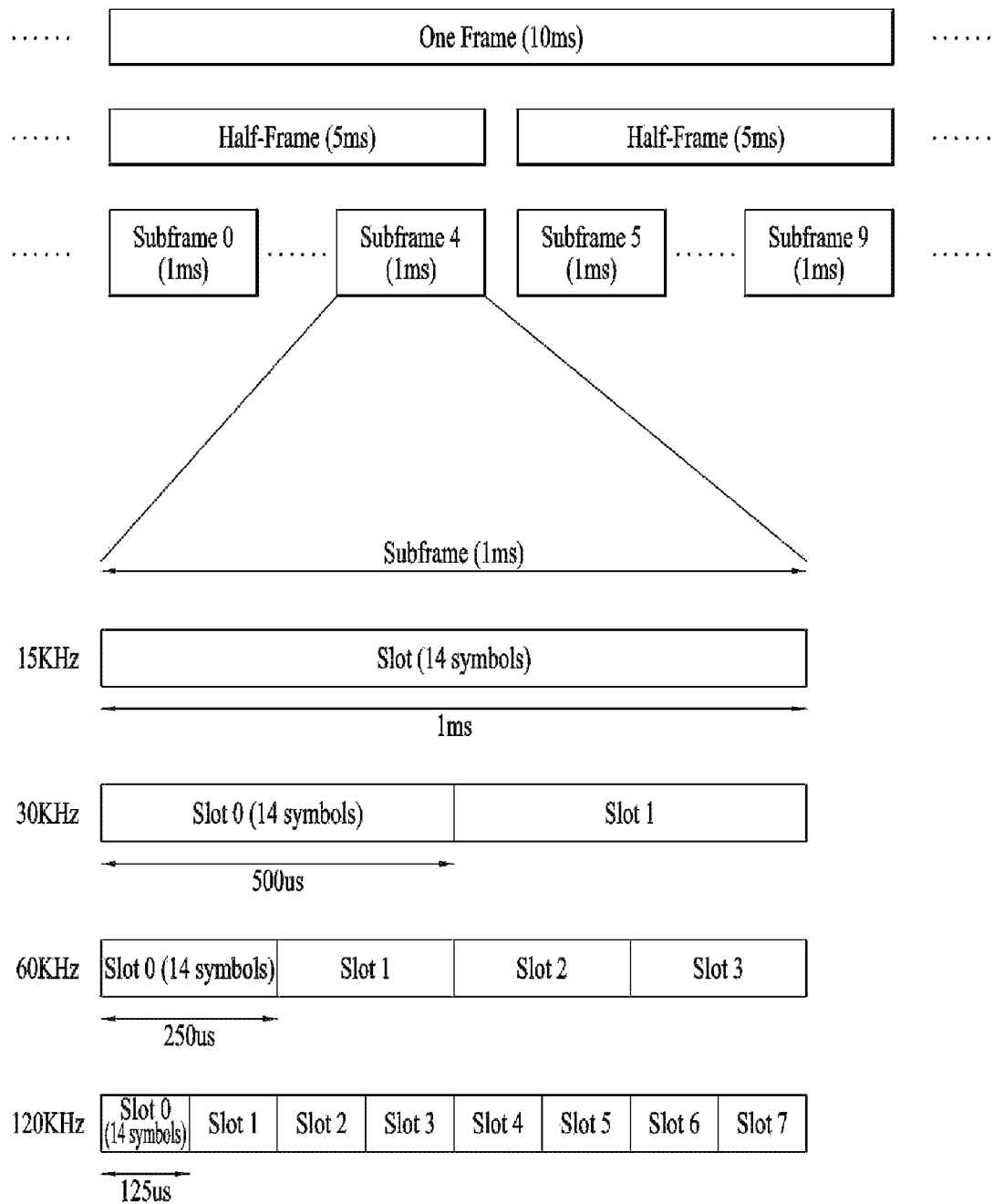
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame, u}_{slot}$ | $N^{subframe, u}_{slot}$ |
| --- | --- | --- | --- |
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
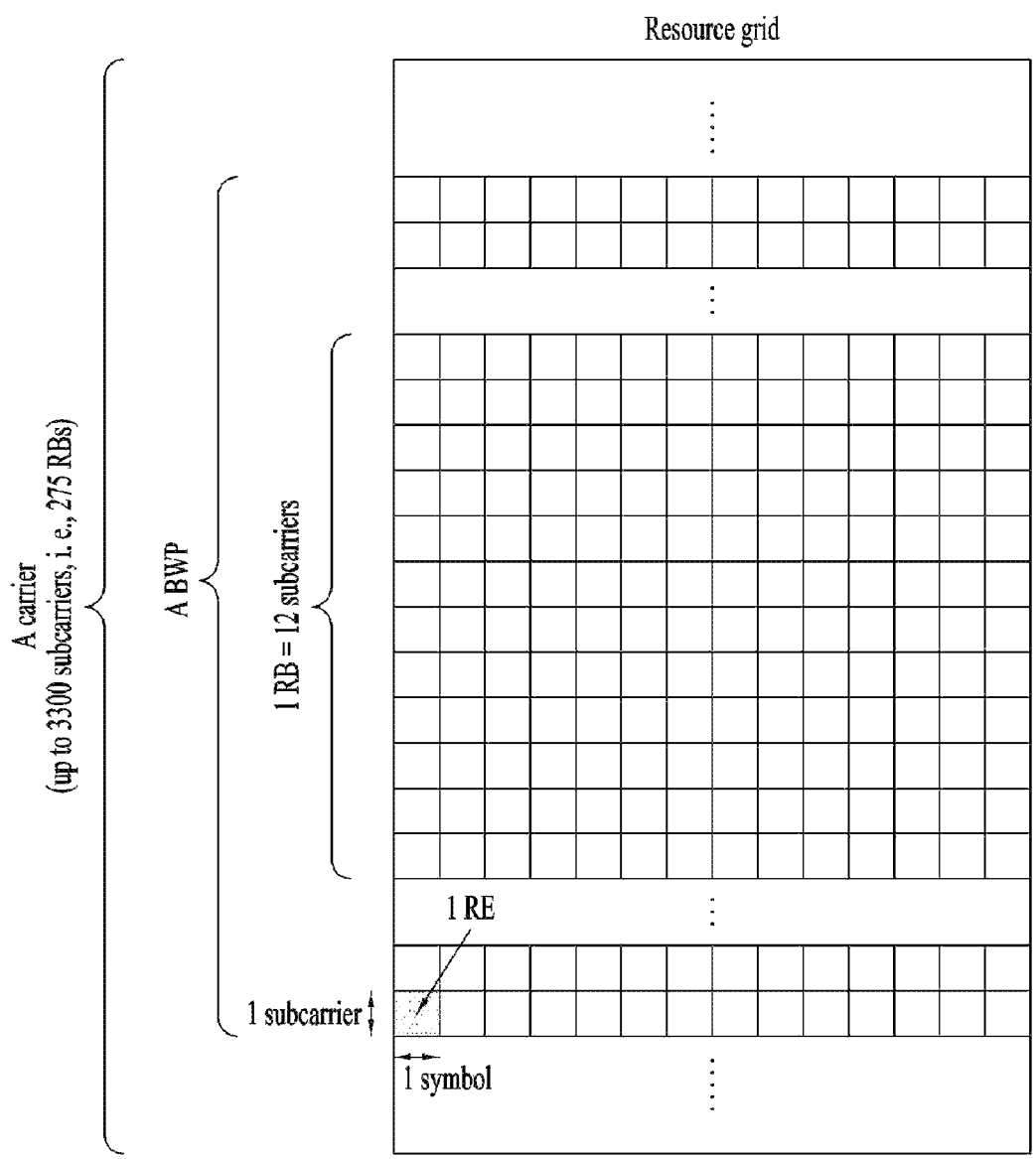
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
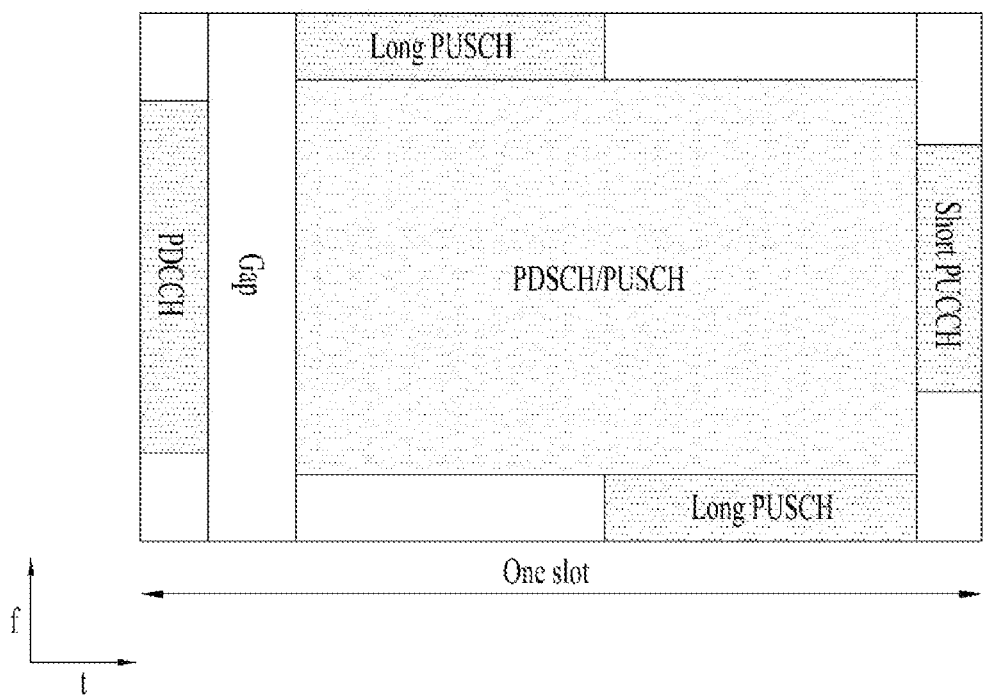
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
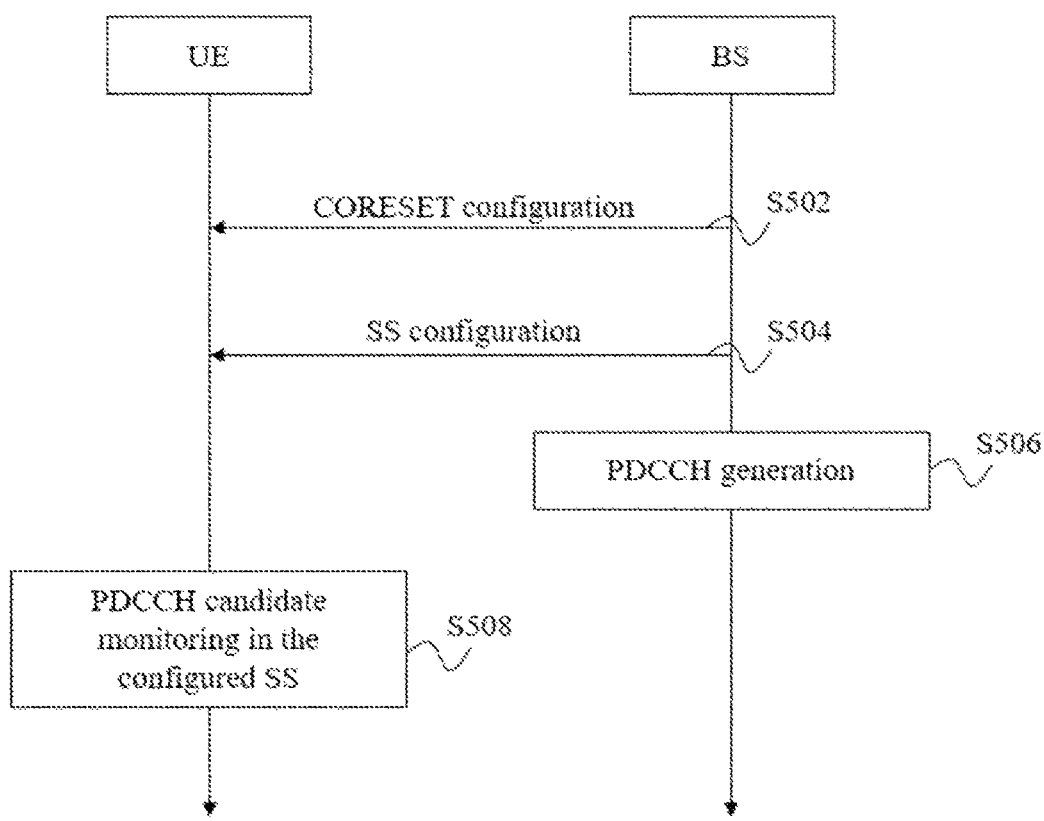
FIG. 5 illustrates an exemplary physical downlink control channel (PDCCH) transmission and reception process.

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. System information (SIB1) broadcast in a cell includes cell-specific PDSCH configuration information, PDSCH-ConfigCommon. PDSCH-ConfigCommon includes a list (or look-up table) of parameters related to a time-domain resource allocation, pdsch-TimeDomainAllocationList. Each pdsch-TimeDomainAllocationList may include up to 16 entries (or rows) each being joint-encoded {K0, PDSCH mapping type, PDSCH start symbol and length (SLIV)}. Aside from (additionally to) pdsch-TimeDomainAllocationList configured through PDSCH-ConfigCommon, pdsch-TimeDomainAllocationList may be provided through a UE-specific PDSCH configuration, PDSCH-Config. pdsch-TimeDomainAllocationList configured UE-specifically has the same structure as pdsch-TimeDomainAllocationList provided UE-commonly. For K0 and an SLIV of pdsch-TimeDomainAllocationList, the following description is referred to.

Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.
frequencyDomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.
duration: Indicates the time-domain resources of the CORESET. It indicates the number of consecutive OFDM symbols included in the CORESET. The duration has a value between 1 and 3.
cce-REG-MappingType: Indicates a control channel element (CCE)-to-REG mapping type. An interleaved type and a non-interleaved type are supported.
interleaverSize: Indicates an interleaver size.
pdcch-DMRS-ScramblingID: Indicates a value used for PDCCH DMRS initialization. When pdcch-DMRS-ScramblingID is not included, the physical cell ID of a serving cell is used.
precoderGranularity: Indicates a precoder granularity in the frequency domain.
reg-BundleSize: Indicates an REG bundle size.
tci-PresentInDCI: Indicates whether a transmission configuration index (TCI) field is included in DL-related DCI.
tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields:

- searchSpaceId: Indicates the ID of an SS.
- controlResourceSetId: Indicates a CORESET associated with the SS.
- monitoringSlotPeriodicityAndOffset: Indicates a periodicity (in slots) and offset (in slots) for PDCCH monitoring.
- monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
- nrofCandidates: Indicates the number of PDCCH candidates (one of values 0, 1, 2, 3, 4, 5, 6, and 8) for each AL where AL={1, 2, 4, 8, 16}.
- searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |

TABLE 3-continued

| Type | Search Space | RNTI | Use Case |
|---|---|---|---|
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Figure 6:
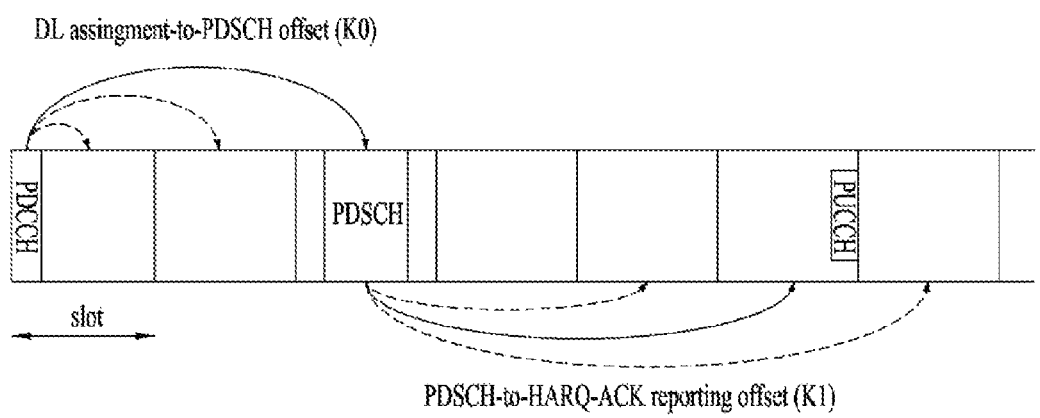
FIG. 6 illustrates an exemplary physical downlink shared channel (PDSCH) reception and acknowledgement/negative acknowledgement (ACK/NACK) transmission process.

FIG. 6 illustrates an exemplary PDSCH reception and ACK/NACK transmission process. Referring to FIG. 6, the UE may detect a PDCCH in slot #n. The PDCCH includes DL scheduling information (e.g., DCI format 1_0 or DCI format 1_1), and indicates a DL assignment-to-PDSCH offset, K0 and a PDSCH-HARQ-ACK reporting offset, K1. For example, DCI format 1_0 or DCI format 1_1 may include the following information.

Frequency domain resource assignment: Indicates an RB set allocated to a PDSCH.

Time domain resource assignment: Indicates K0 (e.g., slot offset), the starting position (e.g., OFDM symbol index) of the PDSCH in slot #n+K0, and the duration (e.g., the number of OFDM symbols) of the PDSCH. As described above, a row index of pdsch-TimeDomainAllocationList provided UE-commonly or UE-specifically may be indicated by a TDRA field.

PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bitwise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 7:
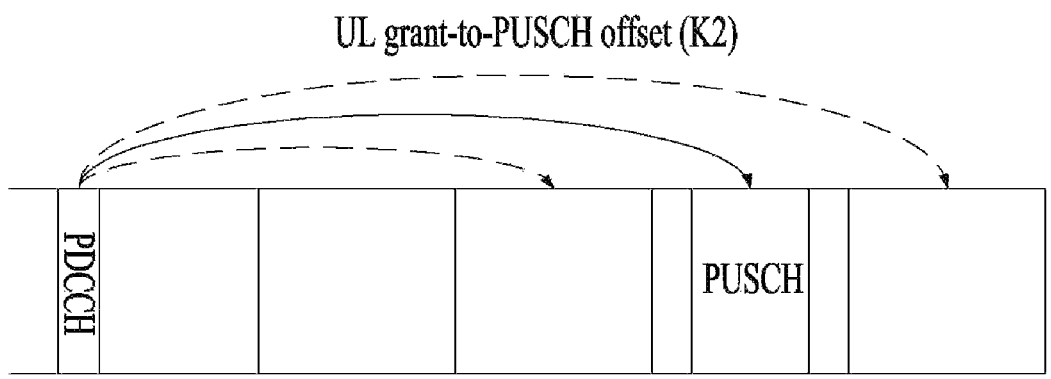
FIG. 7 illustrates an exemplary physical uplink shared channel (PUSCH) transmission process.

FIG. 7 illustrates an exemplary PUSCH transmission procedure. Referring to FIG. 7, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Configuration and Availability Indication of TRS/CSI-RS for Idle/Inactive Mode UEs When reference signal information is provided to an idle/inactive mode UE for UE power saving, disclosed are methods of receiving configuration and/or availability indication for reference signals by the corresponding UE and applying the same.

In LTE systems, synchronization signals (e.g., PSS/SSS) are transmitted every 10 ms, and CRSs are structured in a manner of being transmitted in almost all subframes and PRBs (always on reference signal). Therefore, when a UE intends to perform time/frequency synchronization or tracking or measurement, it is facilitated to use the 'always on reference signal' as described above. Based on NR Rel-16, a UE may utilize SSB for measurement and/or time-frequency tracking in idle/inactive mode. However, an NR UE may wake up unnecessarily or a time-frequency tracking performance may be degraded because a default transmission interval of the SSB including an SSS available for measurement is 20 ms that is relatively long and there is no 'always on reference signal' such as LTE CRS.

Meanwhile, in communication systems such as LTE and NR, paging is used for triggering of RRC setup, system information modification, PWS/ETWS notification and/or the like. When a UE monitors PDCCH at the position of PO configured by a BS and detects a DCI scrambled with P-RNTI, it performs an operation indicated by the corresponding DCI.

Based on Rel-16 NR, i) CSI-RS is a reference signal that may be used for CSI estimation, beam management, and/or time-frequency tracking, and ii) Tracking Reference Signal (TRS) is a reference signal that may be configured for estimation of delay spread and Doppler spread while increasing the performance of time/frequency tracking. Such a TRS/CSI-RS configuration is the information configured via RRC signaling by a UE in a connected mode, and the UE may not expect TRS/CSI-RS in an idle/inactive mode. In Rel-17 NR, methods for receiving TRS or CSI-RS (assumed as transmitted) by idle/inactive mode UEs in a manner of reusing the CSI-RS transmission and structure of the existing Rel.16 are being discussed. The power consumption efficiency may be improved by using TRS or CSI-RS for time/frequency tracking and the like of the idle/inactive mode UEs. Hereinafter, the term TRS/CSI-RS may be replaced with at least one of the terms TRS and CSI-RS.

Unlike the connected mode TRS/CSI-RS configuration, the TRS/CSI-RS configuration for idle/inactive mode UEs may be broadcasted. Therefore, a Base Station (BS) may not accurately know when a UE will receive a transmitted (e.g., broadcasted) TRS/CSI-RS configuration. In order to prevent a UE from wrongly assuming a TRS/CSI-RS transmission, the UE should be able to accurately know an application form and timing of the TRS/CSI-RS configuration received from the BS. In addition, if a TRS/CSI-RS of which reception may be expected (e.g., of which transmission is assumed) by an idle/inactive mode UE is determined depending on a TRS/CSI-RS for a connected mode UE, higher layer signaling for the TRX/CSI-RS for the idle/inactive mode UE may have unique properties different from those of an update system and period of general system information.

On a resource indicated by a TRS/CSI-RS configuration for an idle/inactive mode UE, availability for a UE to expect a TRS/CSI-RS reception may be separately signaled. This may be intended to configure some (or all) information on the TRS/CSI-RS configuration with a semi-static property through higher layer signaling and to control a real transmission through a relatively low signaling overhead, in order to reduce the signaling overhead due to the configuration. As is the case of the above-mentioned TRS/CSI-RS configuration, it may be difficult to accurately specify a reception timing of receiving TRS/CSI-RS availability information for the idle/inactive mode UEs by a UE after transmission of the information by a BS, whereby an ambiguity issue between a BS and a UE may be caused. In addition, when the configuration and the availability are signaled separately, a combination of two different signaling forms should be considered.

In the present specification, proposed are a signaling and application method of a TRS/CSI-RS configuration that idle/inactive mode UEs may expect, a method for determining TRS/CSI-RS availability related to the TRS/CSI-RS configuration, and the like. This may solve the ambiguity issue between a BS and a UE for TRS/CSI-RS configuration and availability and prevent signal/channel reception errors in idle/inactive mode while ensuring a power saving gain of the UE.

Hereinafter, TRS/CSI-RS configuration and availability for an idle/inactive mode UE will be mainly described, by which the present disclosure is non-limited.

Figure 8:
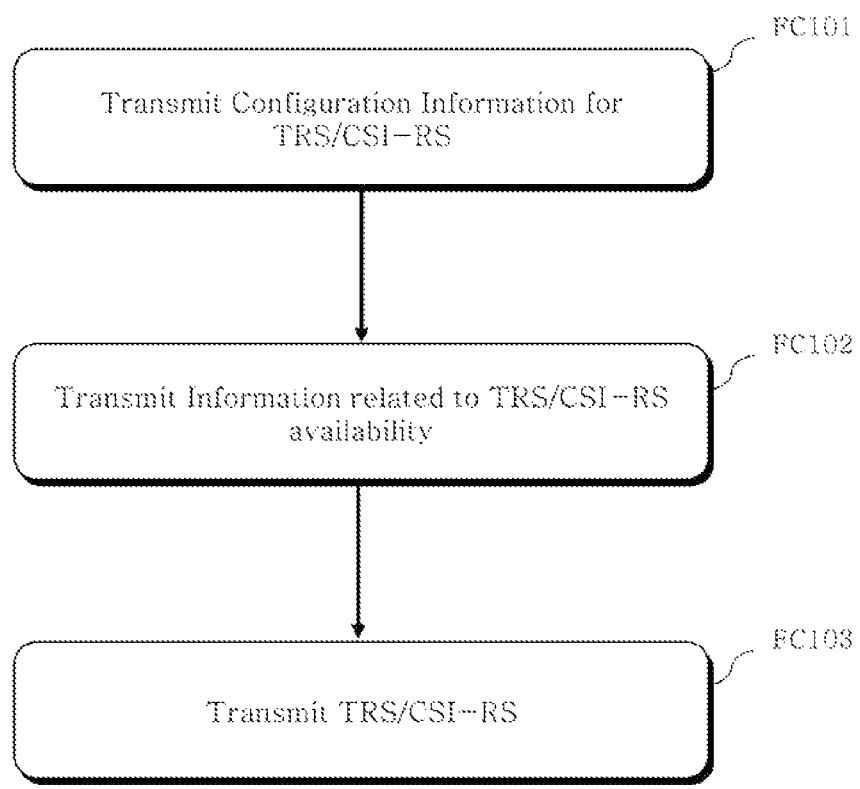
FIG. 8 and FIG. 9 are flowcharts illustrating BS and UE operations.

FIG. 8 shows one example of a BS operation in the present disclosure.

Referring to FIG. 8, a base station may generate and transmit a configuration related to a TRS/CSI-RS (FC101). For example, the configuration may be transmitted using a higher layer signal (e.g. SIB or RRC signaling).

In addition, the base station may generate availability information on the TRS/CSI-RS (configured by the step FC101) and transmit the information (FC102). In this case, an operation of the FC102 may be performed using L1 signaling (DCI or MAC), and in this case, the step FC102 may be subsequently operated to the step FC101. Alternatively, the operation of FC102 may be performed through higher layer signaling, and in this case, the step FC102 may operate after the step FC101 or may be performed together with the step FC101.

The base station may perform transmission of the TRS/CSI-RS based on the transmitted TRS/CSI-RS configuration and the transmitted TRS/CSI-RS availability information (FC103).

Figure 9:
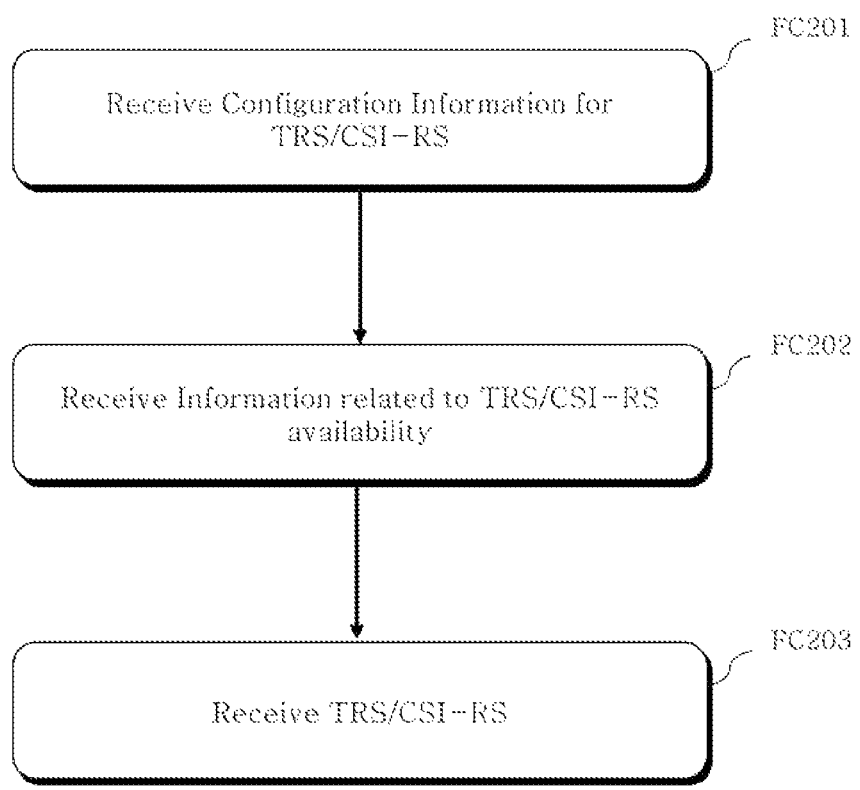

FIG. 9 shows one example of a UE operation in the present disclosure.

Referring to FIG. 9, a UE may receive a configuration related to a TRS/CSI-RS (FC201). For example, the configuration may be received using a higher layer signal (e.g. SIB or RRC signaling). When the UE receives the configuration related to the TRS/CSI-RS from a base station, it 1 may expect an operation according to the proposal in the present specification.

Thereafter, the UE may receive availability information related to the received TRS/CSI-RS configuration from the base station (FC202). In this case, when the availability information is transmitted through L1 signaling (DCI or MAC), the UE may attempt detection of a signal/channel for this. Alternatively, the availability information may be provided through higher layer signaling, and in this case, the UE may perform a higher layer signaling obtaining procedure to obtain the availability information.

Thereafter, the UE may perform a TRS/CSI-RS reception operation based on the received TRS/CSI-RS configuration and the received TRS/CSI-RS availability information (FC203).

The proposals below may be individually implemented without a separate combination or may be implemented in a combination of one or more proposals. Terms, symbols, orders, etc. used herein may be replaced with other terms, symbols, orders, etc.

When a base station selectively supports one of the proposals described below, it may inform a UE of information on the proposal to be supported.

Proposal 1: Modification Boundary Setup of TRS/CSI-RS Configuration

Considered is a situation in which a TRS/CSI-RS configuration related to an idle/inactive mode UE is provided through higher layer signaling (e.g. SIB). When a base station intends to configure a new TRS/CSI-RS configuration, a method of setting a timing and a period to which the new TRS/CSI-RS configuration is applied will be described. The TRS/CSI-RS configuration may mean a set of parameters required for a UE to receive a TRS/CSI-RS. For example, parameters of a TRS/CSI-RS configuration may include a TRS/CSI-RS resource (e.g., an RE on time/ frequency domain), a sequence of a TRS/CSI-RS, and/or at least one of a period and window in which the TRS/CSI-RS may appear.

Idle/inactive mode UEs may obtain various configurations that may be used by a corresponding base station through broadcast information such as SIB. In general, there is no feedback channel of A/N and the like for the broadcast information. Therefore, since a base station is unable to know whether UEs have received the TRS/CSI-RS provided through broadcast information such as SIB, the application timing and/or application section of the corresponding TRS/CSI-RS configuration need to be clearly defined between the base station and the UE.

Modification Period

A modification period may be applied for an update of a TRS/CSI-RS configuration. As a specific example, a TRS/CSI-RS configuration may be updated based on a modification period calculated and classified in units of System Frame Number (SFN). If a TRS/CSI-RS configuration is received within a specific modification period, a UE may expect that the received TRS/CSI-RS configuration will be applied from a modification period next to a specific modification period. For example, a modification period boundary may be defined based on an SFN value satisfying a condition of SFN mod=0. For example, a new modification period may start for each modification period boundary.

A value of 'm' in the formula SFN mod m may be set by a network. Among IEs configured via SIB1, 'm' may be determined through a combination of modificationPeriodCoeff on bcc-Config field and defaultPagingCycle on PDCCH-Config field included in DownlinkConfigCommonSIB. This may be intended to reuse the modification period definitions of other existing SIBs without increasing a separate signaling overhead.

Alternatively, a coefficient of a separate modification period for a TRS/CSI-RS configuration may be defined. For example, a coefficient value that determines a value of 'm' under the condition of SFN mod m=0 for determining a modification period boundary may be separately indicated only for the TRS/CSI-RS configuration. This may be intended to efficiently configure a resource of a TRS/CSI-RS without affecting an operation of other SIB acquisitions if the TRS/CSI-RS configuration property is different from that of a configuration of an idle/inactive mode (e.g. if more frequent configuration changes are required).

Figure 10:
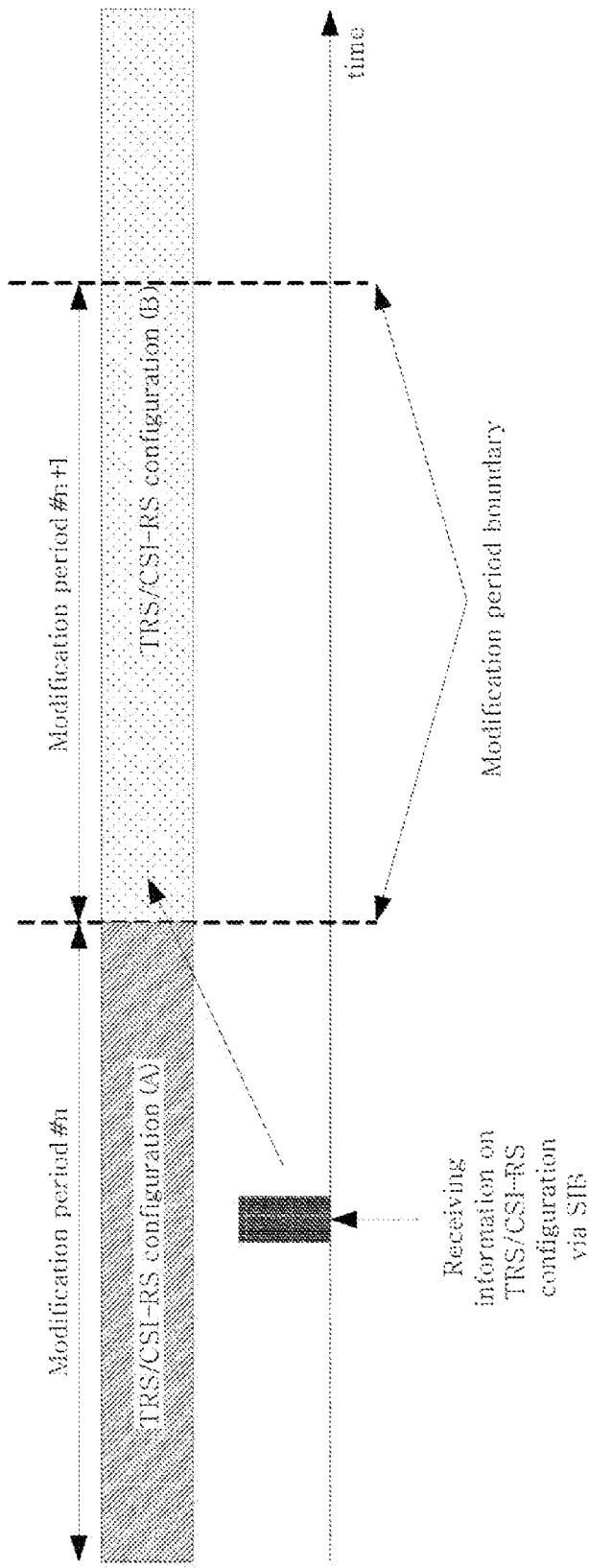
FIGS. 10 to 31 are diagrams to describe availability of TRS/CSI-RS for an RRC idle/inactive mode UE.

FIG. 10 shows one example of TRS/CSI-RS configuration application according to a TRS/CSI-RS configuration acquisition timing and a configuration of a modification period.

Referring to FIG. 10, when a UE acquires a TRS/CSI-RS configuration at a specific timing (e.g., modification period #n), the TRS/CSI-RS configuration may start to be applied from another modification period (e.g., modification period #n+1), and the TRS/CSI-RS configuration may be applied until a modification period boundary located after the UE acquires another TRS/CSI-RS configuration.

Start Timing Indication of TRS/CSI-RS Configuration Via Higher Layer Signaling

For example, information on a TRS/CSI-RS configured for connected mode UEs by a base station may be provided (at least partially the same) for idle/inactive mode UEs, and additional resource overhead of the base station due to transmission of the TRS/CSI-RS may be minimized. For example, the transmission of the TRS/CSI-RS for the idle/inactive mode UEs may be determined as dependent on the states of the connected mode UEs, but the idle/inactive mode TRS/CSI-RS transmission according to this method may not fit well with an idle/inactive mode SI modification operation method. Therefore, for a start timing of more flexible application of a TRS/CSI-RS configuration, the start timing of the application of the TRS/CSI-RS configuration may be separately indicated (e.g., via higher layer signaling).

An SFN corresponding to an application timing of the TRS/CSI-RS configuration may be indicated via higher layer signaling. Since the SFN in which the application of the TRS/CSI-RS configuration starts can be freely selected, configuration flexibility of a base station may be ensured. Alternatively, the application of the TRS/CSI-RS configuration may be started from a timing after a specific offset from a timing at which an SIB is obtained, and the corresponding offset (e.g. SFN) may be indicated via higher layer signaling. A difference between a first SFN corresponding to a transmission timing of a TRS/CSI-RS configuration and a second SFN, which is an application timing of the transmitted TRS/CSI-RS configuration, may be relatively small compared to an expression range of the entire SFN, and signaling overhead may be minimized by signaling only the offset between the second SFN and the first SFN.

Figure 11:
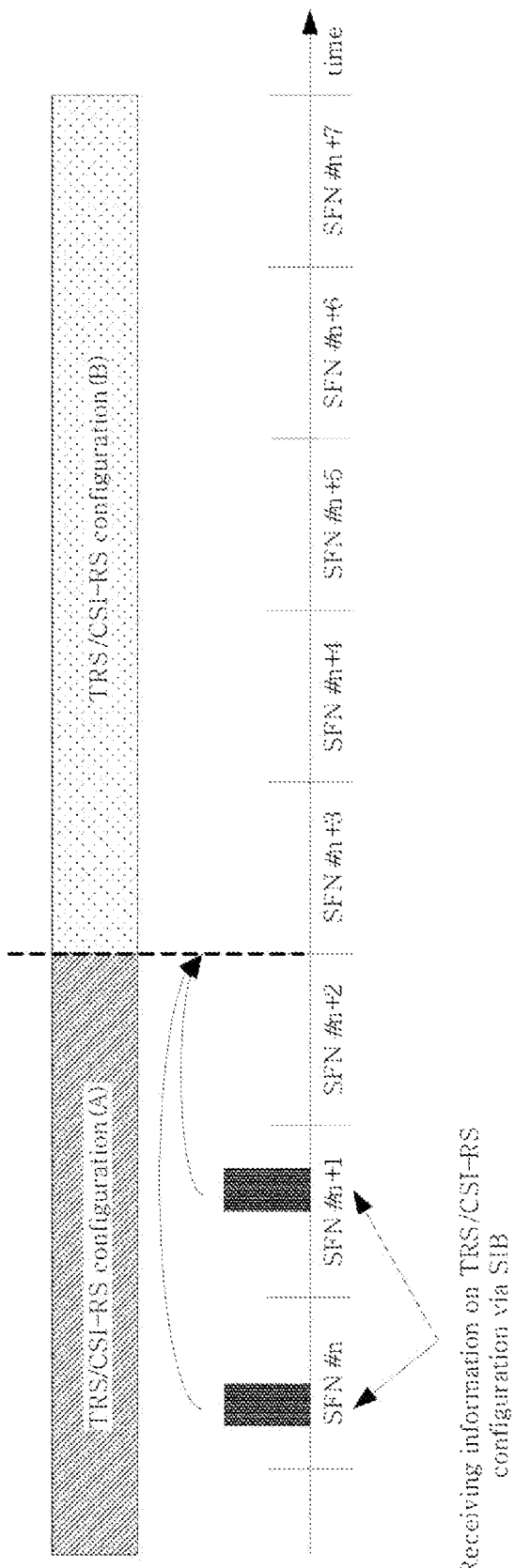

FIG. 11 shows one example of TRS/CSI-RS configuration application based on higher layer signaling.

Referring to FIG. 11, higher layer signaling informations transmitted in SFN #n and SFN #n+1 are related to the same TRS/CSI-RS configuration (e.g., the same TRS/CSI-RS resource and/or occasion), and identically indicate that a location where application of the corresponding TRS/CSI-RS configuration starts is SFN #n+3.

In this case, in a manner similar to a method of Modification Period, a timing for a UE to start application of a new TRS/CSI-RS configuration may be indicated. In addition, since the same higher layer signaling information is repeatedly transmitted, an occasion for the UE to acquire the corresponding TRS/CSI-RS configuration may be increased.

Information of higher layer signaling may be an index of SFN #n+3.

When information on an offset from a timing at which a UE acquires higher layer signaling is provided, an offset of 3 radio frames may be indicated by the higher layer signaling transmitted in SFN #n, and an offset of 2 radio frames may be indicated by the higher layer signaling transmitted in SFN #n+1.

For convenience, a proposed method is described based on SFN, but other units (e.g. symbol, slot, subframe, etc.) in a time domain may also be used.

As another specific example, an application timing of the TRS/CSI-RS configuration may be indicated within a range satisfying a specific condition (hereinafter, condition-A). For example, M SFN(s) within the range of N radio frames (s) may be indicated as application timing of the TRS/CSI-RS configuration. The range of N radio frames may be a range of a modification period. This may be intended to maintain the same time as the modification period for a UE to obtain SIB update information while not limiting a location where the TRS/CSI-RS configuration application starts to a modification period boundary. As a more specific example, when a modification period is configured to become an SFN that satisfies a condition of 'SFN mod=0' with respect to a value m value configured through SIB1, an application timing of a TRS/CSI-RS configuration may be an SFN that satisfies a condition of 'SFN mod=k', and the value k may be a value indicated by a base station.

As an example similar to the above, an SFN in a modification period may be directly indicated. For example, an application start point of a TRS/CSI-RS configuration may be indicated based on Least Significant Bits (LSBs) of an SFN, and a size of the used LSBs may be within the number of bits required to express a range of a modification period. For example, if a modification period has a size of 256 radio frames, no more than eight LSBs may be used to determine an application start point of a TRS/CSI-RS configuration.

Figure 12:
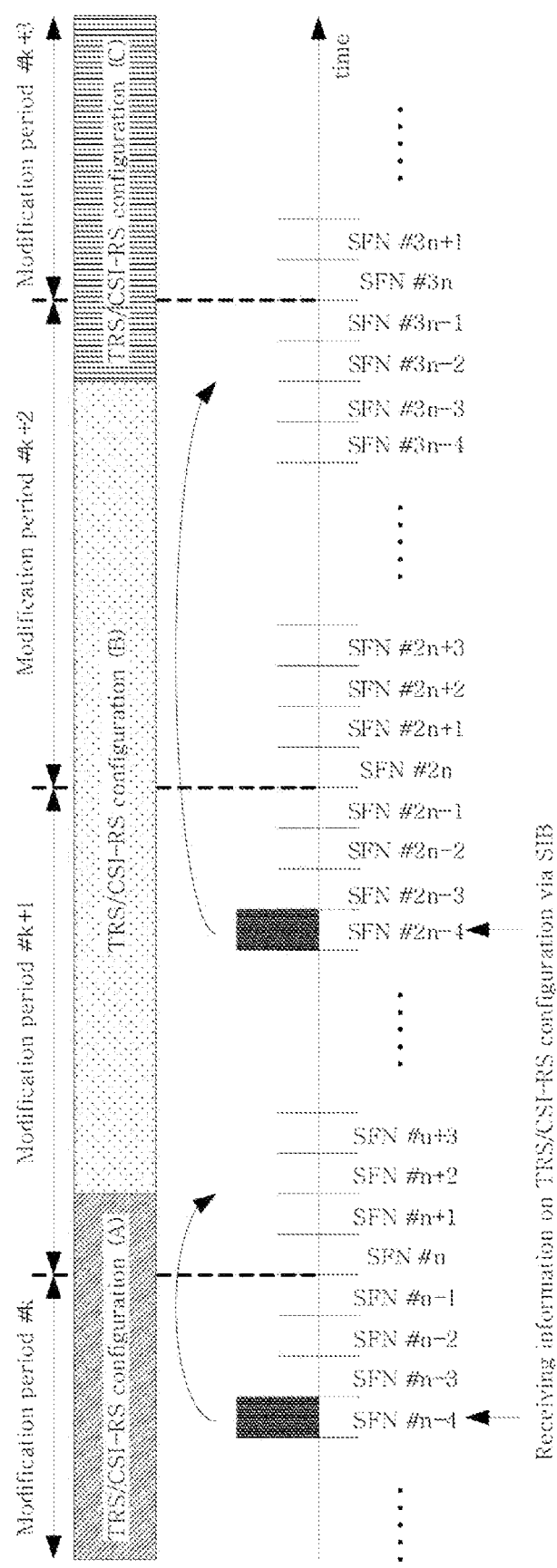

A plurality of SFNs satisfying the condition-A of the above examples may exist. In this case, an additional condition for determining the exact location of an SFN may be defined to solve the ambiguity between a base station and a UE. The additional condition may include a condition in which an application start timing of a TRS/CSI-RS configuration is limited to a next modification period located after transmission of the TRS/CSI-RS configuration. This may be intended to ensure UE's configuration acquisition and preparation for it by maintaining the conditions of the existing modification period boundary (no changes are currently applied within the modification period). FIG. 12 illustrates an example of an additional condition. In FIG. 12, a size of each modification period is n SFNs, a first TRS/CSI-RS configuration (received in SFN #n−4) has a start point of SFN mod n=2 (or an LSB of SFN is a value of 2), and a second TRS/CSI-RS configuration (received in SFN #2n−4) has a start point of SFN mod n=n−2 (or LSB of SFN is a value of n−2).

Figure 13:
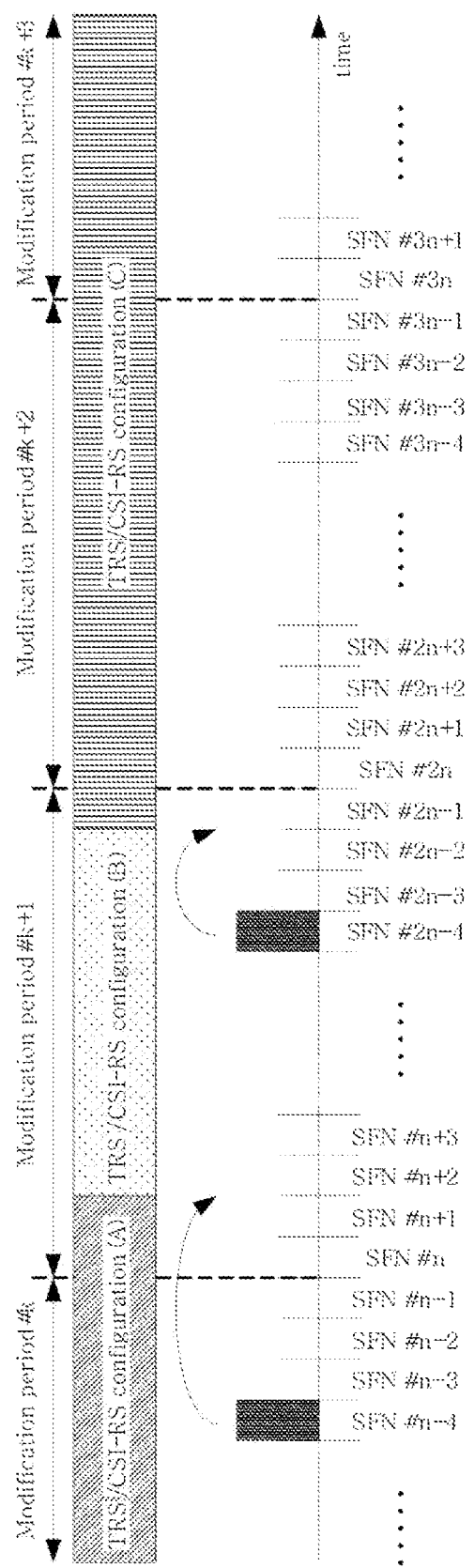

As another example, the additional condition may be determined as the closest SFN that satisfies the condition-A after the timing of transmission of a TRS/CSI-RS configuration. In this case, a TRS/CSI-RS support state for an idle/inactive mode UE may be quickly updated according to the change of a TRS/CSI-RS configuration for a connected mode UE. FIG. 13 illustrates an example of applying such an additional condition. In FIG. 13, a size of a modification period is n, a first TRS/CSI-RS configuration received in SFN #n−4 has a start point of SFN mod n=2 (or LSB of SFN is a value of 2), and a second TRS/CSI-RS configuration received in SFN #2n−4 has a start point of SFN mod n=n−1 (or LSB of SFN is a value of n−1).

Start Timing Determination of TRS/CSIRS Configuration Application Based on UE Feedback When a UE switches from a connected mode to an idle/inactive mode, the UE may receive higher layer signaling from a base station to perform a release procedure for the connected mode. In addition, the UE may receive higher layer signaling for various purposes in the connected mode from the base station. In the case of the UE in an entry state of the connected mode or the idle/inactive mode, the UE may receive higher layer signaling that is dedicated unlike a broadcasted SIB. This means that the UE may transmit feedback on the received higher layer signaling to the base station.

Figure 14:
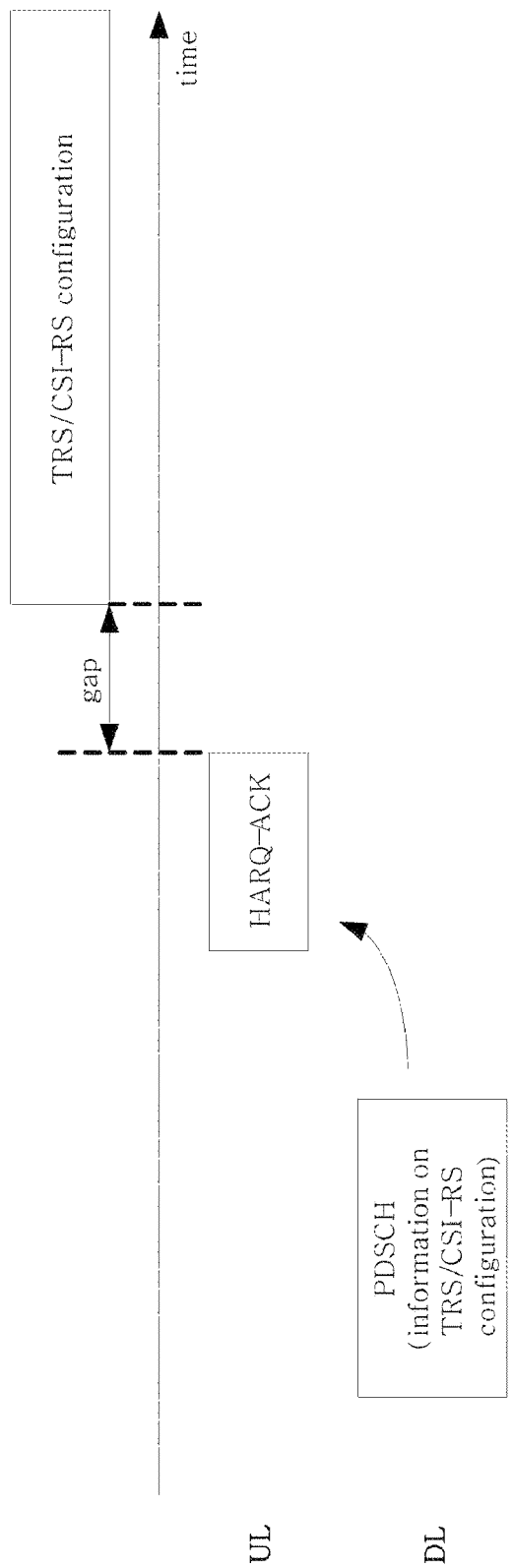

When a UE receives a TRS/CSI-RS configuration from a base station and may inform the base station of a presence or non-presence of a reception of the corresponding information to the base station through a feedback channel, a method of determining an application timing of the TRS/CSI-RS configuration based on a transmission timing of the feedback channel will be described. As a specific example, the feedback channel may include an HARQ-ACK indicating a UE's reception of PDSCH, a UE's decoding success/failure and the like. As a more specific example thereof, referring to FIG. 14, a base station and a UE may apply a TRS/CSI-RS configuration received immediately after the UE has transmitted HARQ-ACK or after a predetermined gap therefrom. Namely, a physical channel through which the UE receives higher layer signaling is PDSCH, and in case of a connected mode UE, when the UE receives signaling of PDSCH, an HARQ-ACK transmission is possible through a corresponding PUCCH resource, and thus there is the advantage of reusing an existing UE operation. In addition, there is the advantage of eliminating the ambiguity between the base station and the UE for the configuration because the base station can know whether the UE has successfully received the TRS/CSI-RS configuration indicated by the base station.

Indication (Direct/Explicit) of End Timing of TRS/CSI-RE Configuration Application For example, information on a TRS/CSI-RS configured by a base station for connected mode UEs may be provided (at least partially the same) for a TRS/CSI-RS for idle/inactive mode UEs, and additional resource overhead of the base station due to TRS/CSI-RS transmission may be minimized. For example, the transmission of the TRS/CSI-RS for the idle/inactive mode UEs may be determined depending on states of the connected mode UEs, but the idle/inactive mode TRS/CSI-RS transmission according to this method may not fit well with an idle/inactive mode SI modification operation. For timing of more flexible TRS/CSI-RS configuration application, application start/end timing of a TRS/CSI-RS configuration may be explicitly indicated (e.g., via higher layer signaling).

A UE may maintain a corresponding TRS/CSI-RS configuration for a maximum specific timer (hereinafter, TRS/CSI-RS_timer) period from a specific timing, and may no longer expect the application of the corresponding TRS/CSI-RS configuration after the period is terminated. In this case, the specific timing may include a timing at which the UE acquires the TRS/CSI-RS configuration or may be determined as a timing at which application of the acquired TRS/CSI-RS configuration starts. In addition, the specific timer may be set to a fixed value promised in advance by the standard, and this value may be separately indicated for a TRS/CSI-RS configuration without following the validity conditions of another SIB. Alternatively, the specific timer may be determined as a value that is indicated by the base station and broadcasted to the UE via higher layer signaling. Namely, as the base station pre-plans an operation section of a TRS/CSI-RS and explicitly pre-informs the UE of a timing at which the corresponding TRS-CSI-RS is further applied, it is advantageous in causing no separate signaling overhead for terminating the corresponding TRS/CSI-RS configuration. If the UE receives a new TRS/CSI-RS configuration before the TRS/CSI-RS timer expires and all or part of the existing TRS/CSI-RS configuration expires through the corresponding TRS/CSI-RS configuration or a new TRS/CSI-RS_timer is indicated, it may be defined/configured to ignore the existing TRS/CSI-RS timer and follow the new configuration.

For example, Proposal 1 may be applied in unit of higher layer signaling that carries a TRS/CSI-RS configuration. If the TRS/CSI-RS configuration is transmitted through an SIB and the SIB includes a configuration for one or more TRS/CSI-RS resources, Proposal 1 may be applied equally to all TRS/CSI-RS configurations included in the corresponding SIB. In this case, since common information is used for all TRS/CSI-RS resources, the overhead required for signaling may be reduced.

Alternatively, Proposal 1 may be applied for each TRS/CSI-RS configuration. For example, if a TRS/CSI-RS configuration is transmitted through an SIB and the SIB includes a configuration for one or more TRS/CSI-RS resources, Proposal 1 may be applied for each TRS/CSI-RS resource (or resource set/group) included in the corresponding SIB. In this case, since a connected mode TRS/CSI-RS may be configured for each UE, flexibility for a configuration may be sufficiently guaranteed.

Proposal 2: L1 Signaling Based TRS/CSI-RS Configuration Availability Indication

For example, an idle/inactive mode UE may receive a TRS/CSI-RS configuration via higher layer signaling (e.g. SIB) and an availability indication indicating whether to transmit a TRS/CSI-RS actually in an TRS-CSI-RS occasion according to the TRS/CSI-RS configuration may be provided. An application range and target of the availability indication may be determined in consideration of the TRS/CSI-RS configuration.

L1 signaling may be used for a TRS/CSI-RS availability indication for idle/inactive mode UEs. For example, when a UE receives a TRS/CSI-RS configuration but fails to receive an availability indication by the L1 signaling, the UE is unable to expect a reception of a TRS/CSI-RS at a location of a configured TRS/CSI-RS resource but may expect only a TRS/CSI-RS reception availability-indicated by the L1 signaling. L1 signaling for an availability indication may include, for example, a signal/channel (e.g., a paging PDCCH or a Paging Early Indication (PEI)) that an idle/inactive mode UE should periodically monitor for each DRX cycle for the purpose of obtaining a paging message, an SI modification, or an ETWS/CMAS information.

When an availability indication is provided based on L1 signaling, a correlation between the availability indication and the TRS/CSI-RS configuration and an application method thereof will be described.

Figure 15:
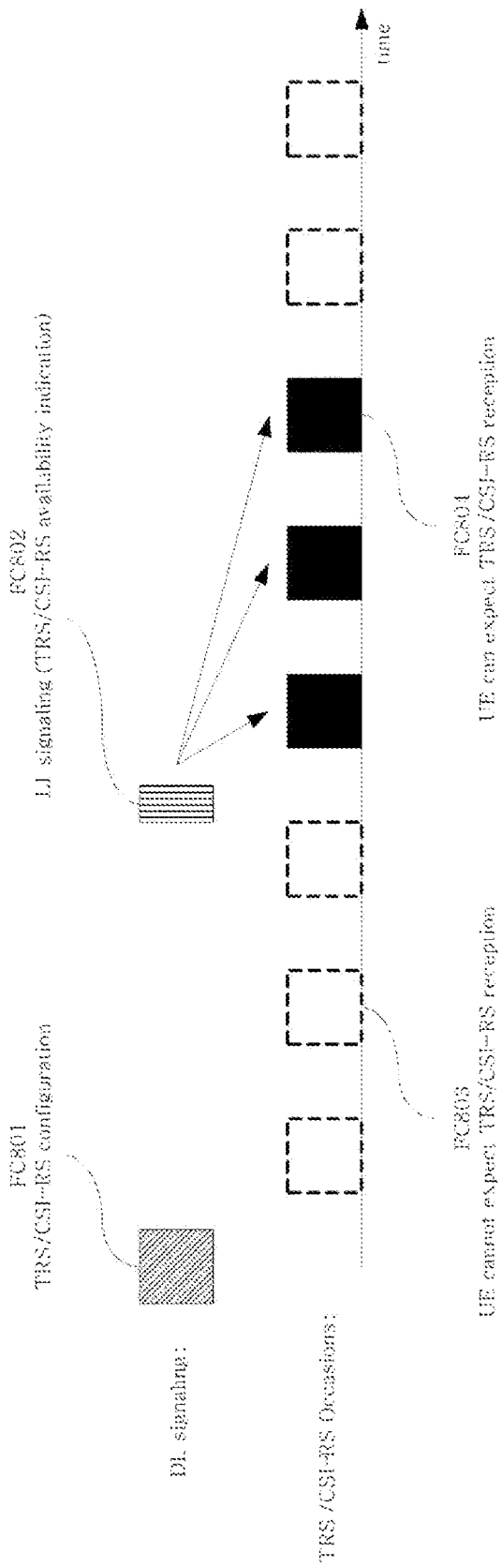

FIG. 15 illustrates an example of TRS/CSI-RS configuration and availability indication for idle/inactive mode UEs.

A UE may obtain information on TRS/CSI-RS resources FC803 and FC804 and the like through a TRS/CSI-RS configuration FC801.

The UE may assume an actual TRS/CSI-RS transmission on the corresponding resource only when an availability indication FC802 corresponding to the received configuration is obtained (FC804).

TRS/CSI-RS availability may be indicated for each TRS/CSI-RS configuration, and the corresponding availability indication may be applied to a predetermined period. If a new TRS/CSI-RS configuration is scheduled to be applied, the UE should be able to know whether the indicated TRS/CSI-RS availability is related to an existing TRS/CSI-RS configuration (hereinafter a first configuration) or a new TRS/CSI-RS configuration (hereinafter a second configuration), and it is necessary to determine the validity of availability indication of a case that the entire or part of the indicated period is included in an application range of the second configuration.

To this end, described in the following are methods of determining a presence or non-presence of TRS/CSI-RS transmission before and after a timing of starting an application of a new TRS/CSI-RS configuration and determining a TRS/CSI-RS configuration related to a TRS/CSI-RS. The timing at which the application of the new TRS/CSI-RS configuration starts may use one of the methods proposed in Proposal 1, for example, a modification period and a modification period boundary, but are not limited thereto.

L1 Signaling Based Availability Indication

An application of a TRS/CSI-RS configuration and an application range of an availability indication may be determined based on L1 signaling (or information obtained by a UE through L1 signaling).

For example, applications of a TRS/CSI-RS configuration becoming an availability indication target and an availability indication may be maintained continuously if there is no separate disable indication. For example, an availability for an once-indicated TRS/CSI-RS resource may be maintained continuously irrespective of a presence or non-presence of an occurrence of a period (e.g. a modification period boundary) in which an application of a new TRS/CSI-RS configuration starts.

Information obtained by a UE through L1 signaling may include L1 signaling timing. For example, it is assumed that the availability is indicated through DCI (e.g., PDCCH that is L1/dynamic signaling) (e.g. paging DCI or PEI). A TRS/CSI-RS configuration related to an availability indication received through the corresponding DCI may be determined based on a DCI's time resource (e.g., location/index of slot and/or PDCCH monitoring occlusion). If one or more TRS/CSI-RS configurations are configured for a UE and the UE receives an L1 signaling (e.g., DCI) indicating a TRS/CSI-RS configuration availability, the UE may identify a specific TRS/CSI-RS configuration related to an availability indication among one or more TRS/CSI-RS configurations configured for the UE based on an index of a time resource on which the L1 signaling is received. As described above, the UE may identify the availability of a specific TRS/CSI-RS configuration based on L1 signaling.

Figure 16:
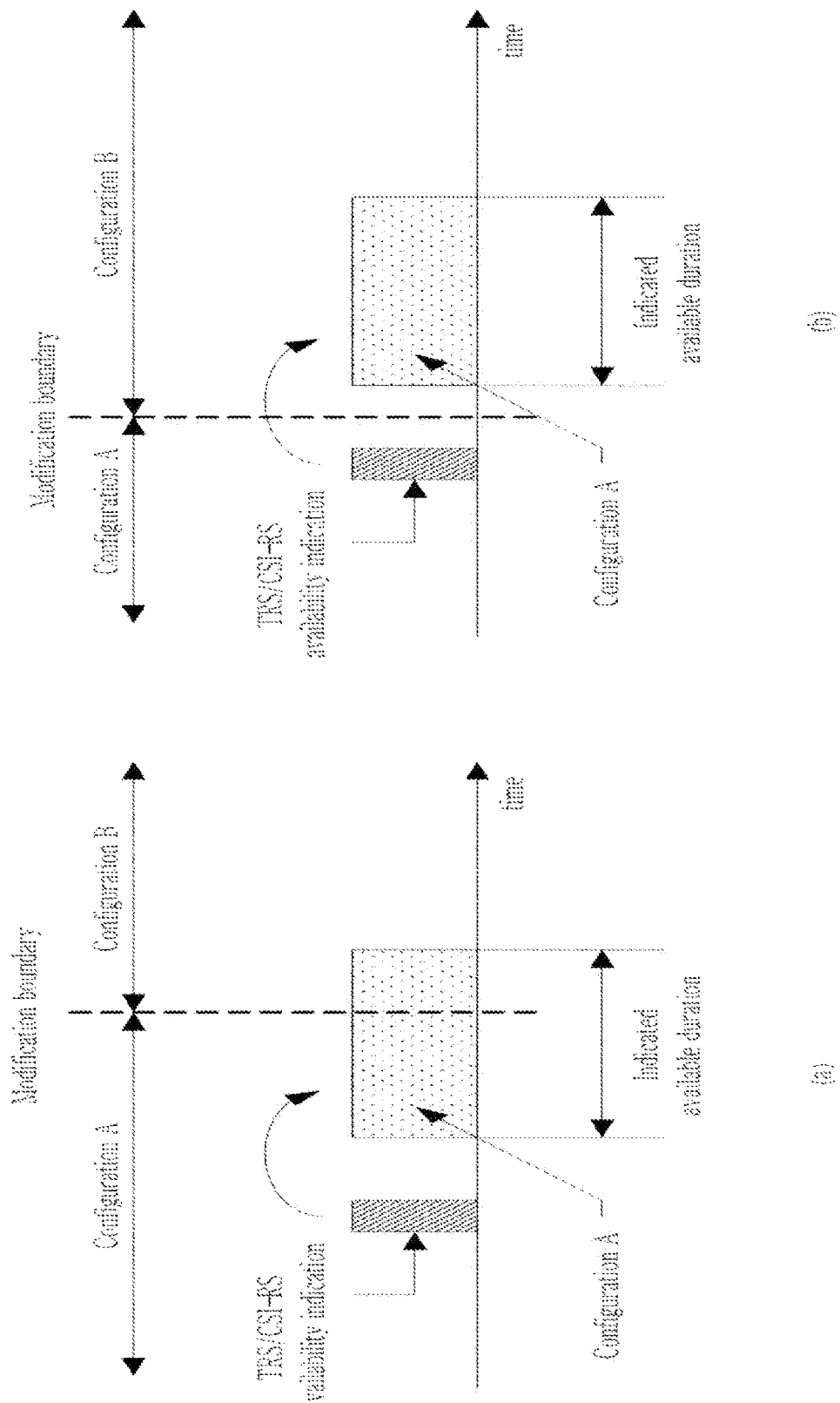

For example, as shown in FIG. 16, if a DCI for an availability indication is received before a modification period boundary (e.g., a first modification period) and all or part of a duration (e.g., a period in which a TRS/CSI-RS can be assumed as transmitted) of a TRS/CSI-RS configuration indicated as available by the DCI is included in a modification period (e.g., a second modification period) to which a new TRS/CSI-RS is applied, a UE may determine that a TRS/CSI-RS configuration related to an availability indication is a TRS/CSI-RS configuration A based on a reception timing of the DCI. For example, the UE may determine that the availability indication relates to the TRS/CSI-RS configuration A based on that the DCI for the availability indication is received in the first modification period and that the first modification period is related to the TRS/CSI-RS configuration A.

The UE may expect a TRS/CSI-RS reception based on the TRS/CSI-RS configuration A for the entire indicated available duration. For example, even if the available duration deviates from the first modification period, the UE may assume that the TRS/CSI-RS configuration A is available for the entire available duration. The availability indication for the TRS/CSI-RS configuration A may remain valid for the entire available duration indicated by the DCI.

Figure 17:
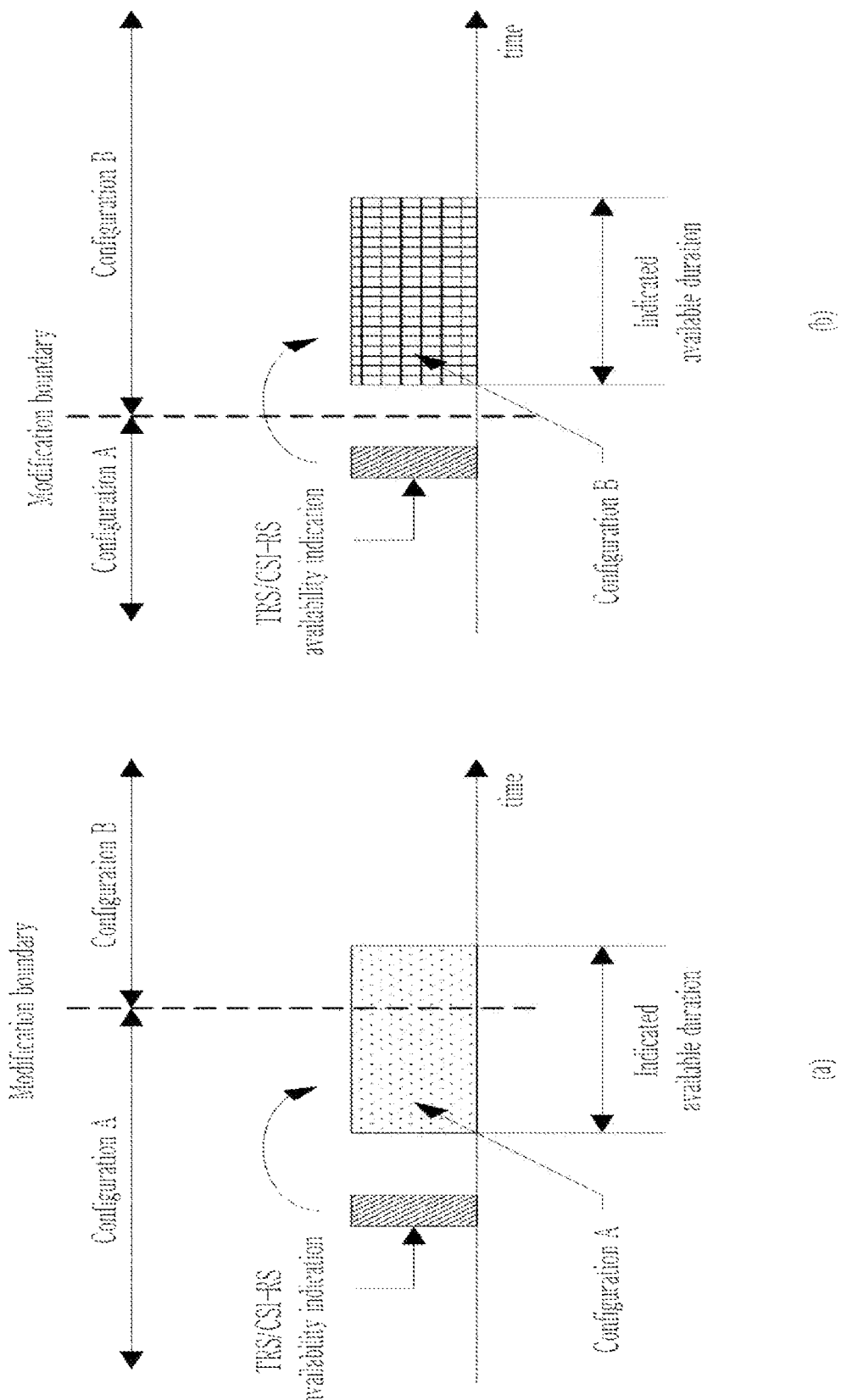

As another example, referring to FIG. 17, when the availability indication is received through DCI (e.g., paging DCI or PEI), a TRS/CSI-RS configuration related to the received availability indication may be determined based on a start point of an available duration (e.g., location of slot). In this case, if a DCI reception timing for the availability indication is before a boundary of a modification period #k and all or part of a transmittable period of a TRS/CSI-RS resource indicated by the DCI is included in the modification period #k to which a new TRS/CSI-RS is applied, a UE may expect to a reception of a TRS/CSI-RS configuration from the beginning to the end (for the entire period) of a TRS/CSI-RS available duration indicated through the DCI.

Figure 18:
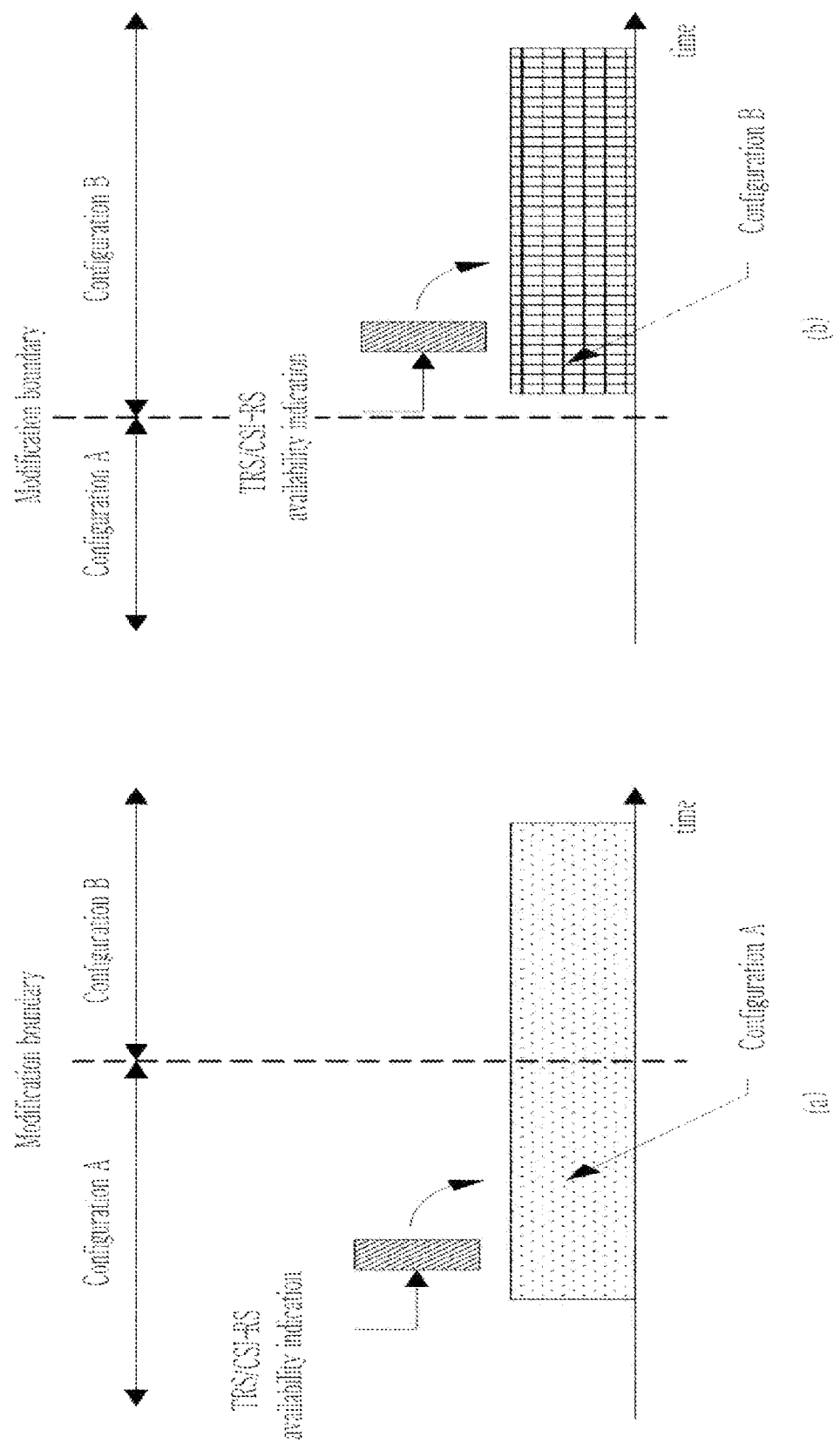

Referring to FIG. 18, when a DCI and a start of a TRS/CSI-RS availability indicated by the DCI are included in the same modification period (e.g., the same DRX cycle), a TRS/CSI-RS configuration may be determined based on the timing of the DCI. Availability of the TRS/CSI-RS configuration may be maintained for a duration indicated by the DCI.

A duration available for a TRS/CSI-RS configuration may be determined through a combination with other conditions.

In FIG. 18 (b), assume a situation that a new TRS/CSI-RS configuration B and a TRS/CSI-RS availability are provided. If a UE first receives a DCI indicating a TRS/CSI-RS availability before receiving an SIB containing the new TRS/CSI-RS configuration B, it may not be able to apply the indicated available duration since the UE is not aware of a TRS/CSI-RS configuration, which is to be applied, at the time the UE receives the DCI (or the indicated available duration starts). Alternatively, the UE may suspend the application of a TRS/CSI-RS availability indication indicated through a DCI until the completion of reception of the SIB including the new TRS/CSI-RS configuration B. After the reception of the SIB has been completed, the UE may apply an availability indication by the DCI.

In this way, a TRS/CSI-RS configuration may be determined based on an L1 signaling timing, and an availability may be maintained during a period indicated by the L1 signaling. A base station may control an actual transmission of a TRS/CSI-RS by using a timing of the L1 signaling or a timing information provided through the L1 signaling.

As another example of information obtained by a UE through L1 signaling, change indication information may be provided through a separate bit (or codeword) included in L1 signaling. For example, if the above availability indication is provided through DCI (e.g. paging DCI or PEI), the corresponding DCI may include a change indication bit(s) to indicate an application target of a TRS/CSI-RS configuration. If the change indication bit indicates that the TRS/CSI-RS configuration is maintained, the UE may expect that a currently applied TRS/CSI-RS configuration will be maintained based on a DCI timing (e.g., a location of a slot). On the other hand, if the change indication bit indicates an application of a new TRS/CSI-RS configuration, the UE may expect that the new TRS/CSI-RS configuration will be applied from a next modification period based on a DCI timing (e.g., a location of a slot).

A 'valueTag' may be used for a change indication. Each TRS/CSI-RS configuration, or higher layer signaling (e.g. SIB) carrying the TRS/CSI-RS configuration, may contain valueTag of 1 bit or more. If a base station intending to newly configure a second configuration may provide the second configuration through higher layer signaling including valueTag having a value different from the current first configuration. In this case, all (or part) information of the valueTag may be included in L1 signaling indicating a TRS/CSI-RS availability. The valueTag may be used to notify a transmission of a new SIB. For example, the existing valueTag information included in SI-Scheduling-Info IE may be reused. For the purpose of reducing signaling overhead, only partial information (e.g. LSB 1 to 2 bits) of the valueTag may be included in the L1 signaling. Alternatively, the valueTag may be configured as a value independent of the existing valueTag.

Figure 19:
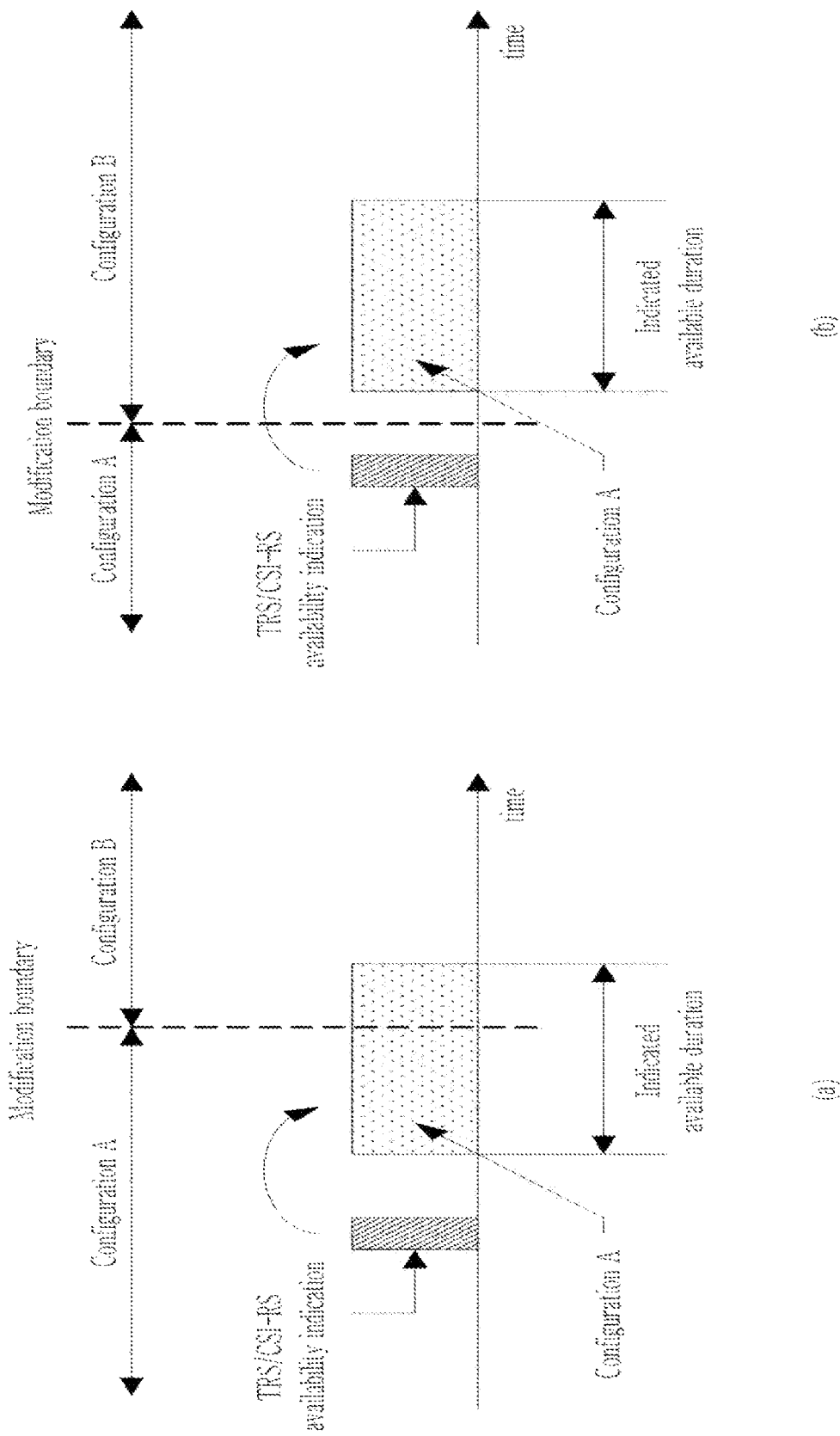

FIG. 19 illustrates an example in which a valueTag of a TRS/CSI-RS configuration is configured with 5 bits and in which a valueTag field of 2 bits is included in L1 signaling. A UE determines a TRS/CSI-RS configuration to which an availability will be applied based on information of a valueTag field included in L1 signaling. A period in which an availability is maintained for the corresponding TRS/CSI-RS configuration corresponds to an entire available duration indicated by a DCI.

In a situation that change indication information is included in L1 signaling, if a UE fails to obtain a TRS/CSI-RS configuration related to the L1 signaling, the UE may not be able to apply an indicated TRS/CSI-RS availability. For example, although a base station transmits a new TRS/CSI-RS configuration to UEs, it may happen that a UE fails to recognize obtain it. Such UEs are unable to receive a TRS/CSI-RS according to the new TRS/CSI-RS configuration.

According to the present example, a base station may more freely indicate a TRS/CSI-RS configuration to be applied. In addition, when information such as valueTag is used, the TRS/CSI-RS configuration to be applied is clearly indicated through L1 signaling, thereby solving a configuration ambiguity issue that may occur between a UE and a base station.

In this way, if a TRS/CSI-RS configuration is determined through information of L1 signaling, and at the same time, a TRS/CSI-RS available duration indicated through the L1 signaling is guaranteed irrespective of a modification period boundary, a UE may solve an ambiguity problem on a transmission assumption of a TRS/CSI-RS attributed to a configuration difference that should be applied before and after the modification period boundary. In addition, since a UE is able to correctly assume a presence or non-presence of a TRS/CSI-RS transmission for a period in which an availability is indicated, the benefit of a power saving gain can be stably expected through a TRS/CSI-RS.

Although DCI-based L1 signaling is described above, proposed methods are also applicable to L1 signaling (e.g. sequence) and MAC layer of other types.

Availability in Consideration of Modification Period Boundary

Described below is a method of determining an application target of a TRS/CSI-RS configuration and an application range of an availability indication in consideration of information obtained by a UE through L1 signaling and a modification period boundary. An indicated TRS/CSI-RS availability may change before and after a modification period boundary. If an availability of a specific TRS/CSI-RS configuration is indicated through L1 signaling, a UE may expect a TRS/CSI-RS only for a period in which the indicated specific TRS/CSI-RS configuration is valid.

An application target of a TRS/CSI-RS configuration and an application range of an availability indication may be determined through an L1 signaling timing. If the availability indication is provided via DCI (e.g. paging DCI or PEI), a TRS/CSI-RS configuration to which the availability indication is applied may be determined based on a modification period to which a received timing (e.g., a location of a slot) of the corresponding DCI belongs, and the availability indication may be valid within the modification period only. If all or part of a TRS/CSI-RS availability period indicated through DCI is included in a modification period where an application of a second configuration starts, the TRS/CSI-RS availability indication by the DCI may no longer be applied after a modification period boundary where the application of the second configuration starts.

Figure 20:
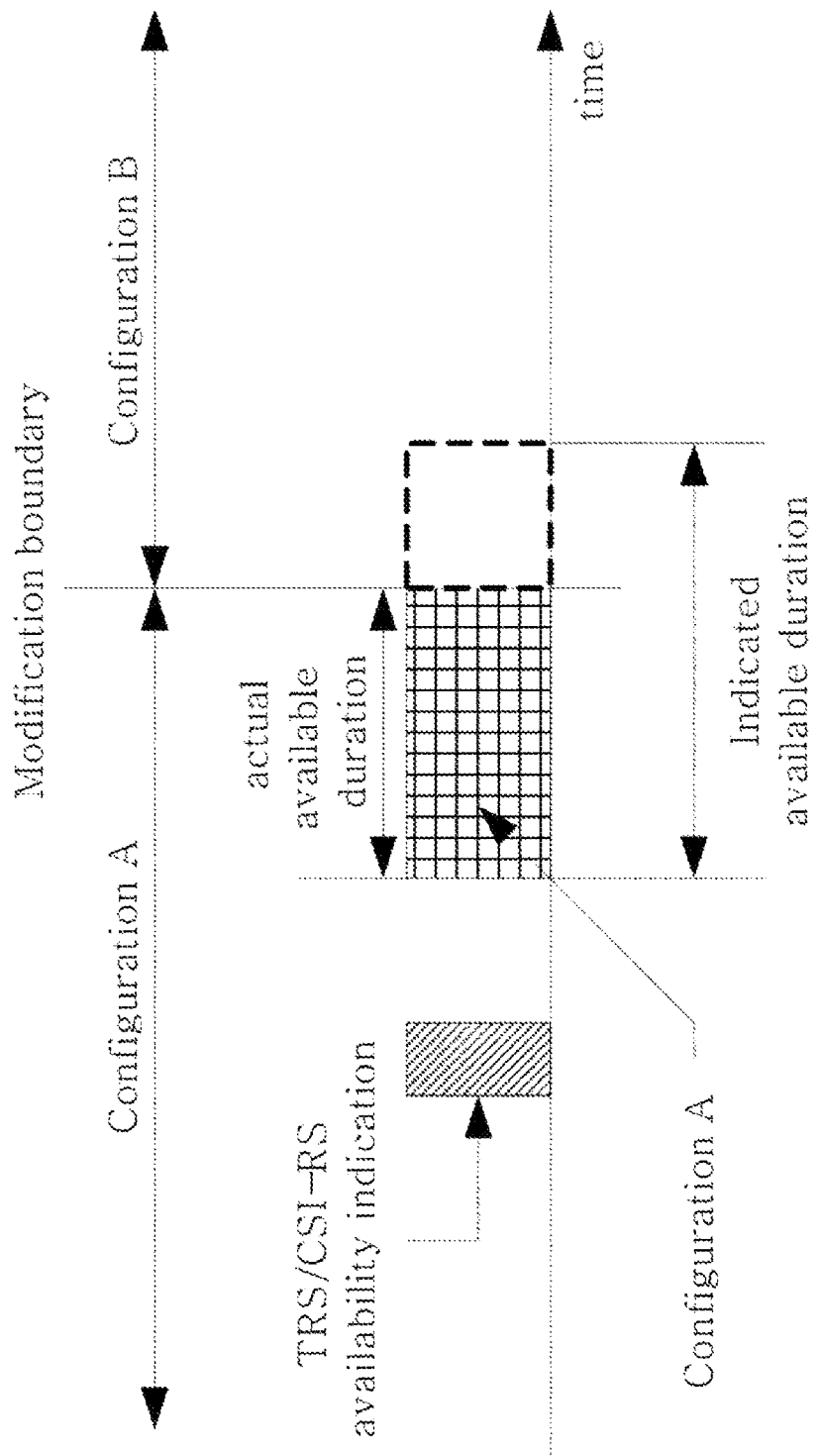

Referring to FIG. 20, a TRS/CSI-RS availability is applied based on a configuration A, which is a timing of receiving a DCI, and even before 'indicated available duration' indicated by the DCI is terminated, a TRS/CSI-RS availability indication by the corresponding DCI may no longer be applied after a modification period boundary where an application of a new configuration B starts.

Alternatively, an application target of a TRS/CSI-RS configuration and an application range of an availability indication may be determined through a start timing of an application of a TRS/CSI-RS availability indication indicated by L1 signaling received by a UE. For example, if the above availability indication is provided via DCI (e.g. paging DCI or PEI), a configuration, which is applied based on a valid TRS/CSI-RS configuration on a modification period to which a timing (e.g., a location of a slot) of starting an application of the corresponding TRS/CSI-RS availability indication belongs, is determined and an availability may be valid only within the modification period. In this case, if a TRS/CSI-RS availability period indicated through DCI spans multiple modification periods, the TRS/CSI-RS availability indication by the above DCI may no longer be applied after a modification period boundary.

Figure 21:
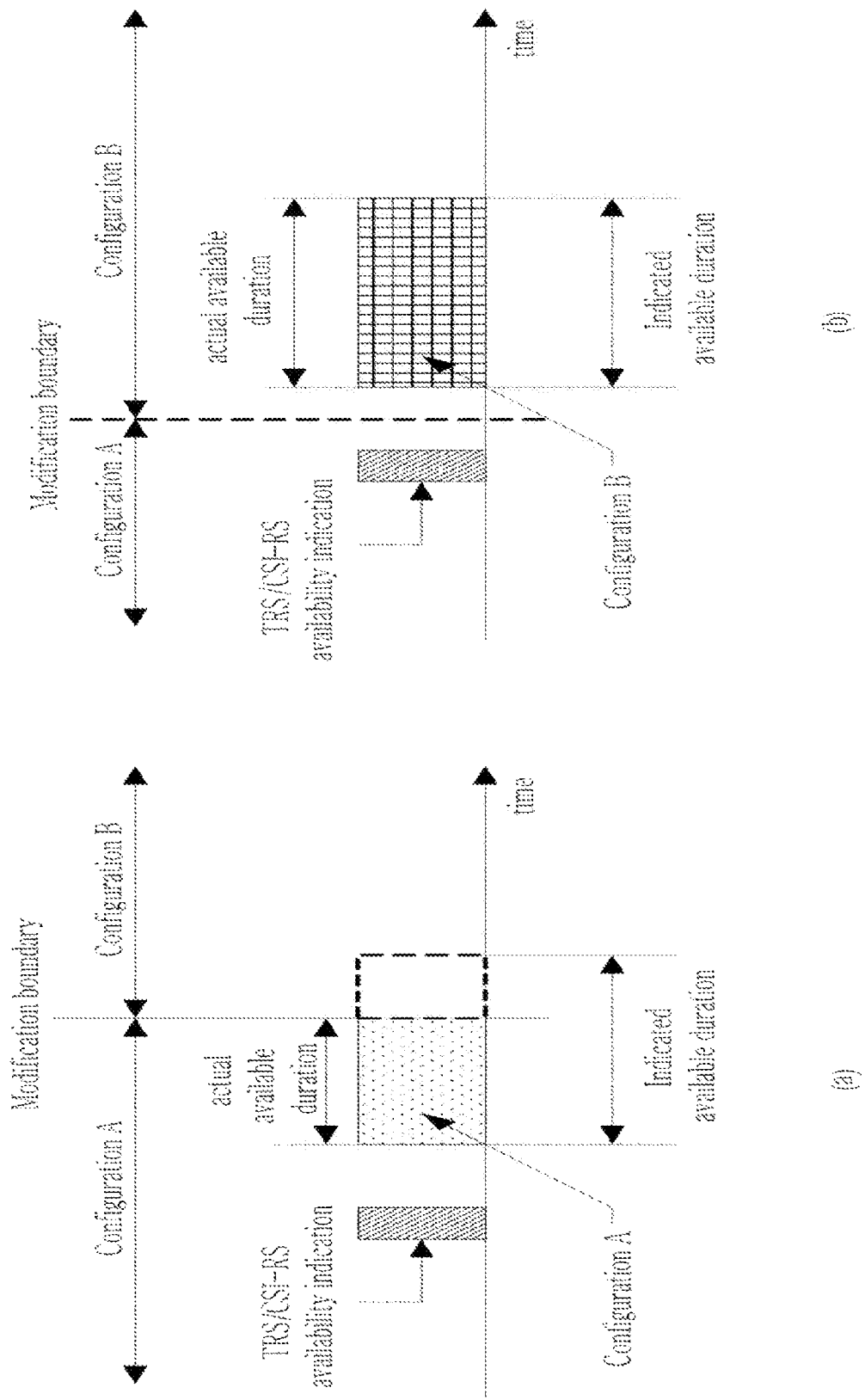

In the example of FIG. 21 (*a*), a TRS/CSI-RS availability indication is applied based on a DCI reception timing, and even before 'indicated availability duration' by a DCI is terminated, a TRS/CSI-RS availability indication by the DCI may no longer be valid after a modification period boundary. In the example of FIG. 21 (*b*), since a TRS/CSI-RS availability is applied to a configuration B and a configuration is not changed for an available duration indicated by a DCI, a TRS/CSI-RS availability may be assumed throughout the indicated available duration.

As described above, a base station may provide application information of a TRS/CSI-RS configuration without generating additional signaling overhead. The base station may control an actual transmission of a TRS/CSI-RS by using a transmission timing of L1 signaling or timing information provided through the L1 signaling.

When change indication information is provided by L1 signaling, a UE may assume an application target and actual availability of a TRS/CSI-RS configuration based on the change indication information. If a change indication bit indicates that a current TRS/CSI-RS configuration is maintained, the UE maintains a currently applied TRS/CSI-RS configuration based on a timing (e.g., a location of a slot) of receiving a DCI, and a period to which an availability indication is applied may be limited within a modification period in which the DCI is received. On the other hand, if the change indication bit indicates an application of a new TRS/CSI-RS configuration, the UE may expect that the new TRS/CSI-RS configuration will be applied within a next modification period based on the timing (e.g., a location of a slot) of receiving the DCI.

A valueTag may be used for a change indication. For example, each TRS/CSI-RS configuration, or higher layer signaling (e.g. SIB) used to transmit a TRS/CSI-RS configuration, may contain a valueTag capable of identifying information of 1 bit or more. In case of intending to configure a new TRS/CSI-RS configuration, a base station may provide a new TRS/CSI-RS configuration through higher layer signaling containing a new valueTag having a value different from that of a previous TRS/CSI-RS configuration. In this case, all (or some) of information of the valueTag is included in the L1 signaling indicating a TRS/CSI-RS availability, and a TRS/CSI-RS configuration matching the included information of the valueTag may be indicated by the L1 signaling. In the above example, the valueTag is used to indicate whether a new SIB is transmitted, and the existing valueTag information included in SI-SchedulingInfo IE may be reused. Typically, for the purpose of reducing signaling overhead, only some information (e.g. LSB 1 to 2 bits) of the valueTag may be included in the L1 signaling. Alternatively, in the above example, the valueTag may be configured as a value independent from the existing valueTag.

Figure 22:
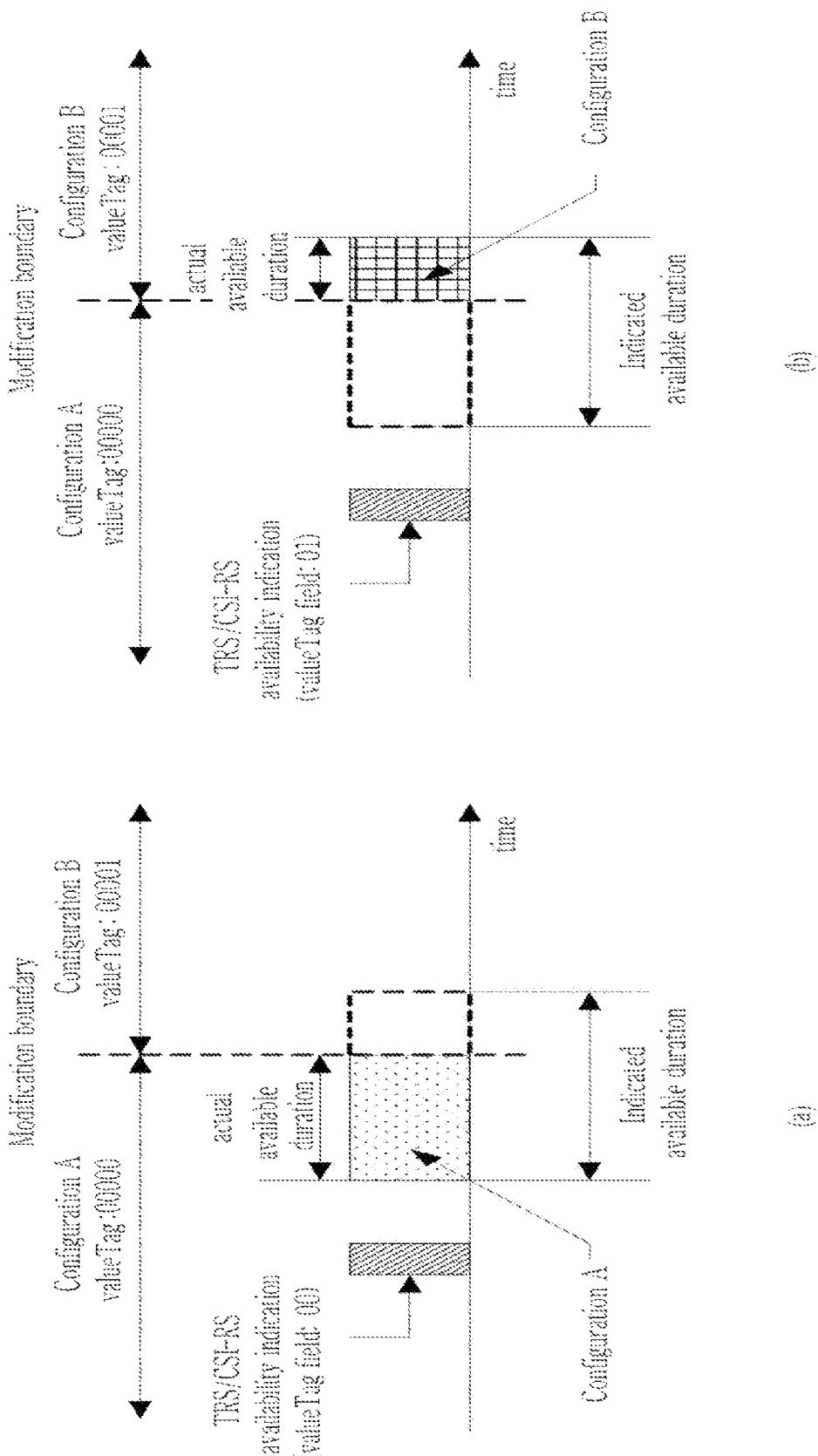

Referring to FIG. 22, a valueTag of a TRS/CSI-RS configuration transmitted through higher layer signaling is configured with 5 bits, and L1 signaling includes a valueTag field of 2 bits. A UE determines a TRS/CSI-RS configuration to which an availability will be applied based on information of the valueTag field included in the L1 signaling, and applies an availability indication only to a period in which a TRS/CSI-RS configuration indicated by DCI is valid.

In a situation where change indication information is indicated through L1 signaling, if a UE fails to obtain a TRS/CSI-RS configuration corresponding to a TRS/CSI-RS configuration indicated by the L1 signaling, the UE may not expect a TRS/CSI-RS availability indicated through the corresponding L1 signaling. For example, a base station transmits a new TRS/CSI-RS configuration to UEs, but the UE may not recognize/acquire it, and these UEs are unable to expect a reception of a TRS/CSI-RS having a new TRS/CSI-RS configuration applied thereto (e.g., assume that the TRS/CSI-RS will be transmitted).

According to the present embodiment, a base station may control a transmission of a TRS/CSI-RS for a TRS/CSI-RS configuration, which is intended to stop being supported by the base station, to match a modification period. In addition, when information such as valueTag is used, since an applied TRS/CSI-RS configuration is clearly indicated through L1 signaling, a configuration ambiguity issue between a UE and a base station can be resolved.

As one of methods of determining an application target of a TRS/CSI-RS configuration and an application range of an availability indication in consideration of a modification period boundary, a TRS/CSI-RS availability currently applied by a UE may be maintained based on an end timing of a modification period #n+1 in which the UE progresses an SI update procedure. In doing so, the TRS/CSI-RS availability being applied above may be indicated prior to the modification period #n+1 in which the SI update process is progressed. For example, if a UE receives indication information about an SI update through paging DCI (e.g., indication information included in a short message field in a paging DCI), it may perform an SI update procedure in a next modification period (hereinafter, a modification period B) located after receiving the paging DCI. If an available duration that the UE can assume through an availability indication received before the modification period B is included in the modification period B, the UE may maintain an actual transmission assumption of a TRS/CSI-RS included in the available duration for the modification period B. If an end timing (e.g., a timing determined by a reference point and a configured duration determined based on a reception timing of L1 signaling) of the available duration exists within the modification period B, the UE may assume the indicated TRS/CSI-RS availability until the end of the available duration. If the indicated end timing of the available duration is located after the end timing of the modification period B, the UE may assume the indicated TRS/CSI-RS availability until the end timing of the modification period B only.

Figure 23:
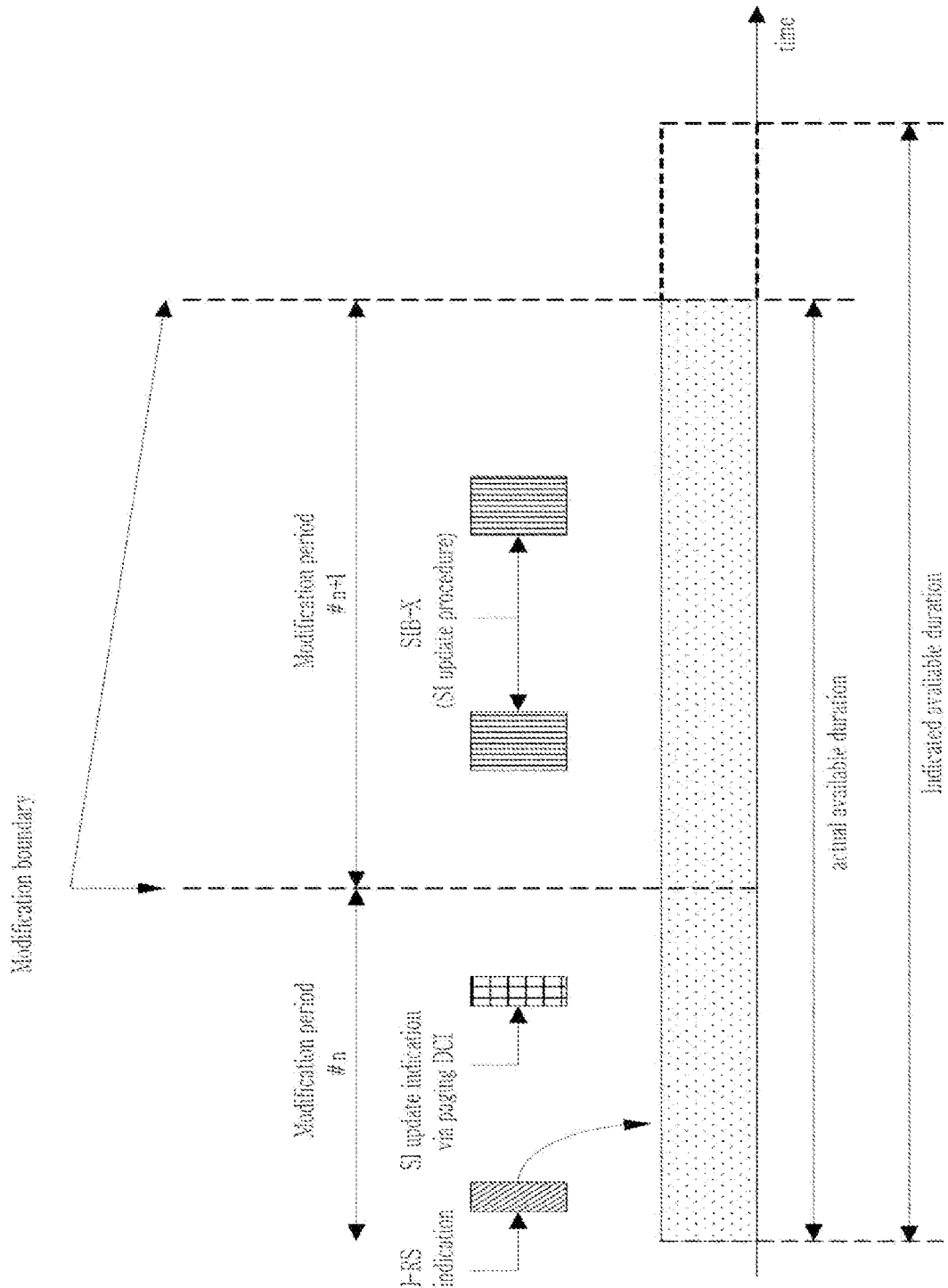

Referring to FIG. 23, a UE receives a TRS/CSI-RS availability indication in a modification period #n, and assumes an available duration based on it. In this case, when the UE receives information of an SI update indication in the modification period #n through paging DCI and receives a new configuration by performing an SI update procedure for a TRS/CSI-RS configuration in a modification period #n+1, the UE maintains an available duration of an already-indicated TRS/CSI-RS till an end of the modification period #n+1 only and no longer assumes that it is available thereafter.

In this way, if a procedure for updating an SI for a TRS/CSI-RS configuration is progressed in the same way as a general SI update procedure defined in the NR, a UE may maintain an availability for a TRS/CSI-RS in use without ending it. Therefore, it is possible to solve the ambiguity problem for assumptions of a TRS/CSI-RS that may occur before completion of the SI update. In particular, since a base station is unable to know a timing of for idle/inactive state UEs to finish the SI update procedure by completing the SIB reception, a modification period, which becomes a reference of an SI update completion timing, is used in units, thereby solving the ambiguity problem that may be caused by information mismatch between a base station and a UE. In addition, it is possible to solve the problem of increasing network overhead, which is caused by the base station continuously ensuring an availability for a TRS/CSI-RS of which an SI update is already completed, by clearly configuring an end timing of the already indicated available duration.

Availability in Modification Period Unit

A TRS/CSI-RS configuration having an availability indicated through L1 signaling and an available duration may be applied in unit of a modification period. When a TRS/CSI-RS availability is indicated through L1 signaling in a first modification period, an application of a corresponding availability indication may be applied in a second modification period located after the first modification period. In this case, a TRS/CSI-RS configuration having the availability indication applied thereto may become a TRS/CSI-RS configuration of the second modification period.

As one example of a proposed method, if the availability indication is provided via DCI (e.g. paging DCI or PEI), a UE may assume that a TRS/CSI-RS will be received by the UE in a next modification period based on a modification period to which a timing (e.g., a location of a slot) of receiving the corresponding DCI belongs. In this case, a TRS/CSI-modification configuration may include a TRS/CSI-RS configuration configured for a modification period in which the reception can be assumed.

A method of indicating a TRS/CSI-RS availability for a plurality of modification periods may be used. For example, a method of indicating a plurality of modification periods may use a method of indicating the number of modification periods to which an availability indication is applied through L1 signaling, which may be suitable for the purpose of allowing a base station to dynamically control a TRS/CSI-RS available duration. For another example, a length of a plurality of the modification periods may be preconfigured by higher layer signaling such as SIB or may use a value predetermined by a standard. This may be useful to ensure the performance of L1 signaling by reducing the signaling overhead of the L1 signaling.

Figure 24:
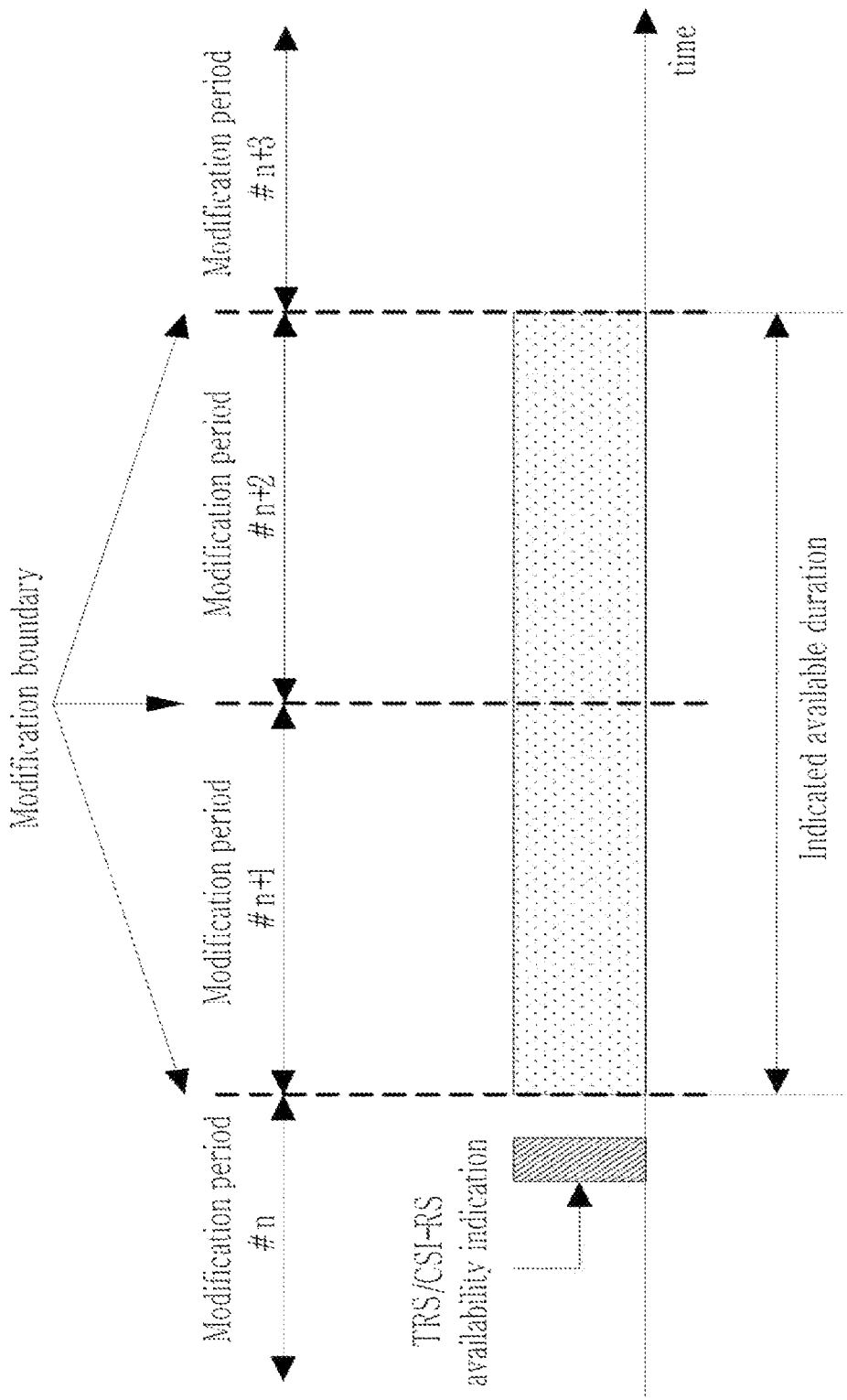

Referring to FIG. 24, L1 signaling transmitted in a modification period #n indicates a TRS/CSI-RS availability for two modification periods, and as a result, a UE may assume that a TRS/CSI-RS will be transmitted in modification periods #n+1 and #n+2.

As another method of applying the proposed method to a plurality of modification periods, it is able to use a method of indicating an activation of a TRS/CSI-RS by L1 signaling and maintaining the activation of the TRS/CSI-RS until an occurrence of a separate deactivation indication. This can reduce the signaling overhead for transmission of L1 signaling if the activation of the TRS/CSI-RS is maintained for a relatively long period. For example, if a UE is informed, through L1 signaling in a modification period at a specific timing, that a reception based on a TRS/CSI-RS configuration is possible, the UE may assume that the indicated TRS/CSI-RS is available in a next modification period and so on. Alternatively, it may be assumed that a TRS/CSI-RS indicated from a timing of receiving L1 signaling or a time interval (e.g. modification period, default paging cycle, PF, etc.) containing the reception timing is available so that a UE can utilize the indicated TRS/CSI-RS for a fast timing. After an activation of an availability related to a TRS/CSI-RS configuration has been transmitted, L1 signaling may be transmitted for the purpose of indicating a deactivation of a TRS/CSI-RS in the activation state. In this case, when receiving the L1 signaling for the deactivation indication, the UE may not assume that a TRS/CSI-RS subject to become a target of the deactivation is available from a modification period located after the reception timing. In this case, in a remaining section of the same modification period in which the L1 signaling indicating the deactivation is received, it is able to continue to expect a transmission of a TRS/CSI-RS that becomes a target.

Figure 25:
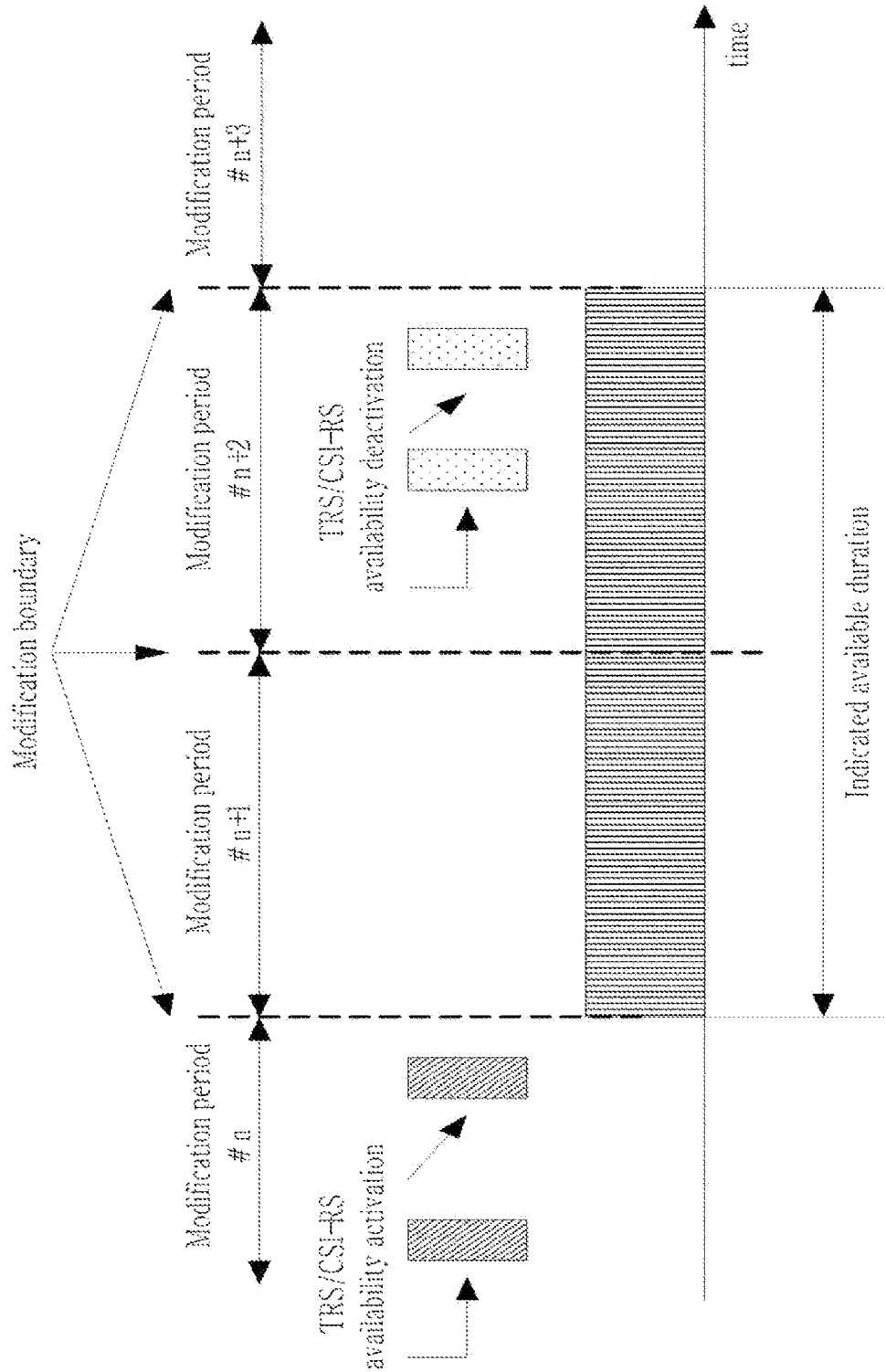

Referring to FIG. 25, a plurality of L1 signalings transmitted in a modification period #n indicate that a specific TRS/CSI-RS configuration will be identically activated from a modification period #n+1. In addition, a plurality of L1 signalings transmitted from a modification period #n+2 indicate that a specific TRS/CSI-RS configuration will be identically deactivated from a modification period #n+3.

In this way, in a situation of indicating that a resource of a specific TRS/CSI-RS is available through L1 signaling, when a new TRS/CSI-RS configuration is provided through higher layer signaling (e.g. SIB), the indicated TRS/CSI-RS availability may be terminated. For specific example, if update information on a new TRS/CSI-RS configuration is provided through higher layer signaling at a specific timing, a UE may assume that an availability indication for a TRS/CSI-RS configuration is no longer valid from a modification period located after the specific timing.

In this way, when a TRS/CSI-RS configuration having an availability indicated through L1 signaling and an indicated available duration are applied in unit of a modification period, it is possible to solve an ambiguity issue and the like between a base station and a UE, which may occur due to missing of L1 signaling and the like. For example, the base station may repeatedly send L1 signaling multiple times to indicate the same TRS/CSI-RS availability within a modification period, and the UE may determine whether to apply/release a TRS/CSI-RS availability indication through multiple occasions, thereby reducing the probability with an inconsistency in the availability assumption between the base station and the terminal.

As another example, it may be able to use a method of setting a start point (hereinafter referred to as a reference point) of a frame satisfying SFN mod (X*m)=0 as a start point of an indicated available duration and setting X*m radio frames as a length of an indicated available duration. In this case, a value of m is a value indicating the number of radio frames that determine a modification period, is configured by SIB1, and has a multiple of a default paging cycle. A value of X may also be a value configured by a base station or predetermined in the standard as an arbitrary positive integer for determining the indicated available duration. In this case, when the availability indication is provided via DCI (e.g. paging DCI or PEI), if an SFN of a timing (e.g., a location of a slot) of receiving the corresponding DCI meets the condition of SFN mod (X*m)< (X*m−Y), a nearest location among previous reference points (current SFN included) is determined as a start point of the indicated available duration, and the UE may assume that a TRS/CSI-RS will be transmitted in a period of X*m radio frames from the start point. So to speak, since the UE is unable to use a TRS/CSI-RS before DCI reception, the UE may assume the provision of a TRS/CSI-RS from a timing of receiving the DCI (or by leaving a predetermined gap from the reception timing) to a location of a next reference point. In addition, when the availability indication is provided through DCI (e.g., paging DCI or PEI), if an SFN of a timing (e.g., a location of a slot) of receiving the corresponding DCI meets the condition of SFN mod (X*m)≥ (X*m−Y), a nearest location among the reference points located thereafter as a start point of the indicated available duration, and the UE may assume that a TRS/CSI-RS will be transmitted in a period of X*m radio frames from the start point. In addition, the UE may be determined to assume the provision of a TRS/CSI-RS in a period from the timing (or modification period, default paging cycle, or PF to which the reception timing belongs) of receiving a DCI by the UE to a location where a next indicated available duration starts. A value of Y may be a default paging cycle or may be determined as a multiple of the default paging cycle. In this case, the UE may directly assume and utilize a transmission of the TRS/CSI-RS in the modification period in which the DCI indicating the TRS/CSI-RS availability is received. Since the TRS/CSI-RS availability is indicated in units of a modification period, the same TRS/CSI-RS availability information may be provided to all UEs in the same cell. Moreover, since an end timing of the indicated available duration is determined in units of a modification period, there is an advantage that a cycle of updating a TRS/CSI-RS configuration matches the end timing of the indicated available duration. In addition, when a TRS/CSI-RS availability is indicated through DCI in a last section of the indicated available duration, a section having the corresponding indicated information applied thereto is extended as a section of a next indicated available duration, whereby it brings an advantageous effect in aspect that the UE can assume a TRS/CSI-RS availability in a long period more stably. If a value of Y is set to 0 in the proposed method, the proposed method may mean that a location where the TRS/CSI-RS availability assumption indicated by DCI starts is always fixed to a just-before reference point.

Figure 26:
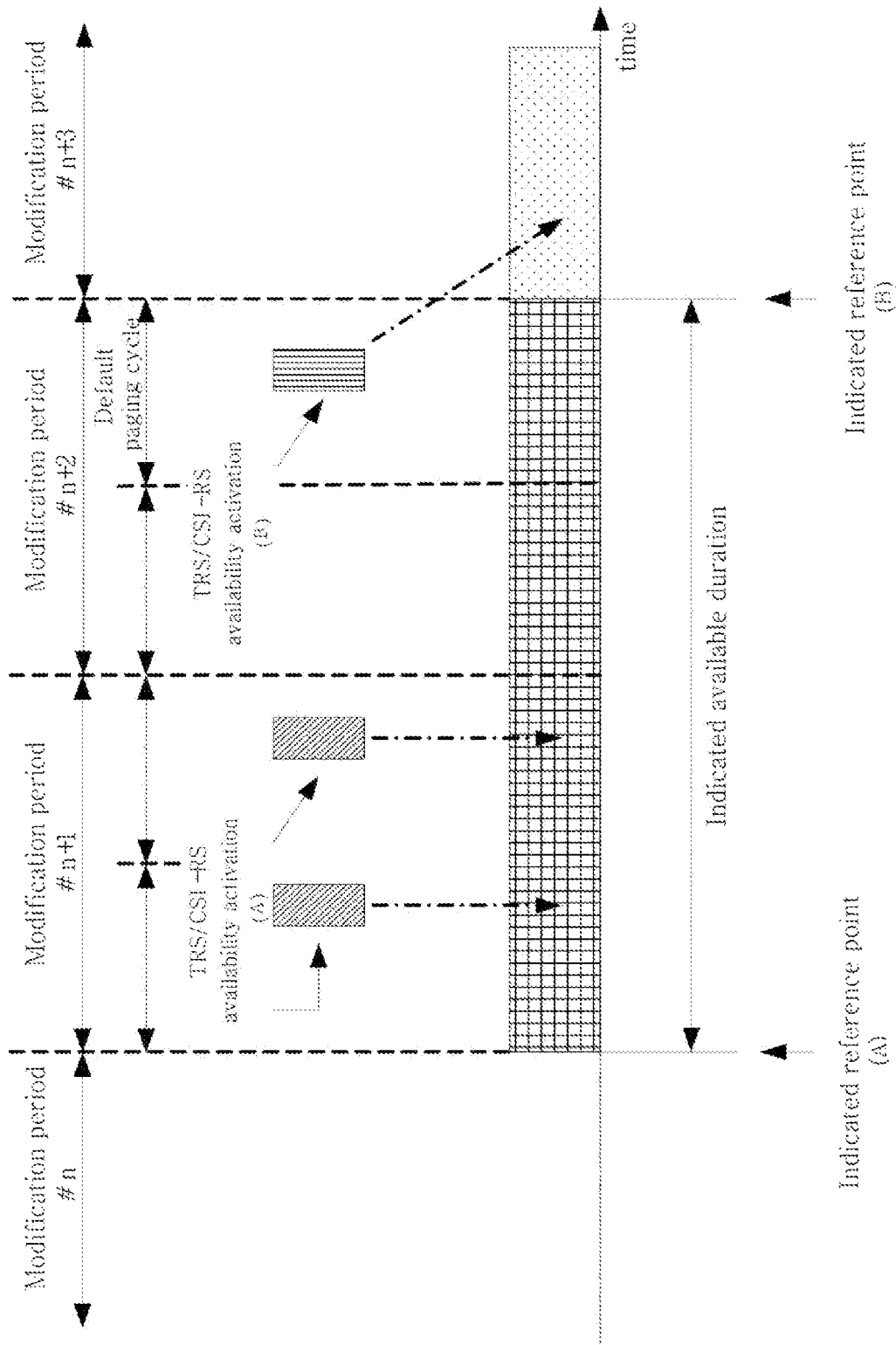

Referring to FIG. 26, illustrated is a case where X=2 and Y is determined by the number of radio frames of a default paging cycle length of one time. In this case, a TRS/CSI-RS availability indication transmitted in a section of a last default paging cycle length in a section of an indicated available duration may be applied during two modification periods by starting from a reference point (e.g., indicated reference point (B)) located thereafter, and a TRS/CSI-RS availability indication transmitted/received in other sections within the indicated available duration may be applied during two modification periods by starting from a just-before reference point (e.g., indicated reference point (A)).

Proposal 3: Availability Indication Based on Higher Layer Signaling in Consideration of TRS/CSI-RS Configuration A TRS/CSI-RS configuration of which reception may be expected (e.g., of which transmission may be assumed) by an idle/inactive mode UE is provided through higher layer signaling (e.g. SIB), and an availability indication indicating a presence or non-presence of an actual transmission of a TRS/CSI-RS based on the TRS/CSI-RS configuration provided through the higher layer signaling (e.g. SIB) is proposed.

A method of an availability indication through L1 signaling is advantageous in terms of scheduling flexibility of a base station because it allows a base station to dynamically control a transmission of a TRS/CSI-RS for an idle/inactive mode UE. On the other hand, if the base station intends to guarantee a long-term transmission of a TRS/CSI-RS for the idle/inactive mode UE, the availability indication method through L1 signaling may cause an increase in network overhead. In this situation, the TRS/CSI-RS availability indication method through higher layer is advantageous in terms of network overhead. Considering the features and advantages of such a signaling method, when providing availability indication information on an actual provision of a TRS/CSI-RS based on higher layer signaling, correlation between the indication information and the TRS/CSI-RS configuration and methods for applying the same will be described.

A TRS/CSI-RS availability indication may be indicated by an availability related to a specific TRS/CSI-RS configuration as described above, and may be applied by targeting a predetermined period. In this case, if a new TRS/CSI-RS configuration is scheduled to be applied, a UE should determine which information (i.e., an existing TRS/CSI-RS configuration (hereinafter a first configuration) or a new TRS/CSI-RS configuration (hereinafter a second configuration)) is targeted by an indicated TRS/CSI-RS availability and how to apply assumption of an availability if the entire or part of an availability indicated period is included in an application range of the second configuration. To this end, disclosed are methods of determining a presence or non-presence of a transmission/reception of a TRS/CSI-RS that a UE can expect before and after a timing of starting an application of a new TRS/CSI-RS configuration and determining a reference for a configuration to be selected. As the timing of starting the application of the new TRS/CSI-RS configuration may use one of the methods proposed in Proposal 1 of the present disclosure, and for example, a modification period and a modification period boundary may be used. Although a modification period and a modification period boundary are illustrated below, the present disclosure is non-limited thereto and may be generally applied to methods of determining an application reference of a new TRS/CSI-RS configuration.

Configuration & Availability Indication

When a TRS/CSI-RS configuration is provided through higher layer signaling, availability information related to the TRS/CSI-RS configuration may be provided together.

For example, a TRS/CSI-RS configuration provided through higher layer signaling may include availability information for each configuration. For example, if higher layer signaling, indicating a TRS/CSI-RS availability corresponds to an SIB and information on a plurality of TRS/CSI-RS configurations can be provided through the SIB, information related to an availability corresponding to a configuration may be included in an IE that configures each TRS/CSI-RS configuration. In this case, if availability information exists in a specific configuration and possibility (or a possible period) of an actual transmission/reception of a TRS/CSI-RS is provided, a UE may be defined/configured to expect a reception (e.g., assume a transmission) based on a corresponding TRS/CSI-RS configuration according to the indicated information. If the availability information fails to exist in a configuration or an actual transmission/reception is not indicated despite a presence of the availability information, the UE may be defined/configured to assume an actual transmission/reception based on the corresponding TRS/CSI-RS configuration only through another signaling (e.g. L1 signaling or higher layer signaling transmitted at another timing). Alternatively, as another method of indicating an availability for each TRS/CSI-RS configuration, a method of configuring a separate IE in the higher layer signaling to indicate an availability related to each TRS/CSI-RS configuration may be used. For example, if higher layer signaling indicating a TRS/CSI-RS availability corresponds to an SIB, an index is assigned to each TRS/CSI-RS configuration and information of an index for available configurations may be included in an IE that indicates an availability. Namely, since it is not necessary to provide a TRS/CSI-RS configuration to an SIB every time for an availability indication without causing overhead due to an index, an effect of signaling overhead reduction can be obtained in a situation where a TRS/CSI-RS configuration does not change frequently.

As another method of providing both a TRS/CSI-RS configuration and an availability, a TRS/CSI-RS configuration provided through higher layer signaling may contain availability information for the entire configuration. For example, if a base station does not operate an availability indication for separate L1 signaling and supports an availability indication through higher layer signaling only, all TRS/CSI-RS configurations configured through higher layer signaling may be available.

Start Timing of Availability

Depending on the information and properties provided by higher layer signaling, an application target of a TRS/CSI-RS configuration and an application start timing of an availability indication may be determined.

If higher layer signaling, which represents a TRS/CSI-RS availability, has a property of periodically being broadcasted, or provides information through a broadcasting procedure that all UEs in idle/inactive mode can receive, a start point of the TRS/CSI-RS availability may be determined in units of a modification period. If higher layer signaling indicating a TRS/CSI-RS availability corresponds to an SIB and the SIB may be periodically transmitted or provided via an SI update procedure through a paging short message, an availability for a TRS/CSI-RS may be applied from a modification period subsequent to a timing at which a UE obtains an SIB through the above methods. Namely, in case of an SIB update through the periodically broadcasted SIB and the SIB update procedure, it may be intended that all UEs expecting a reception of it may reflect a state of assumption for transmission and reception of a TRS/CSI-RS after having obtained information.

Figure 27:
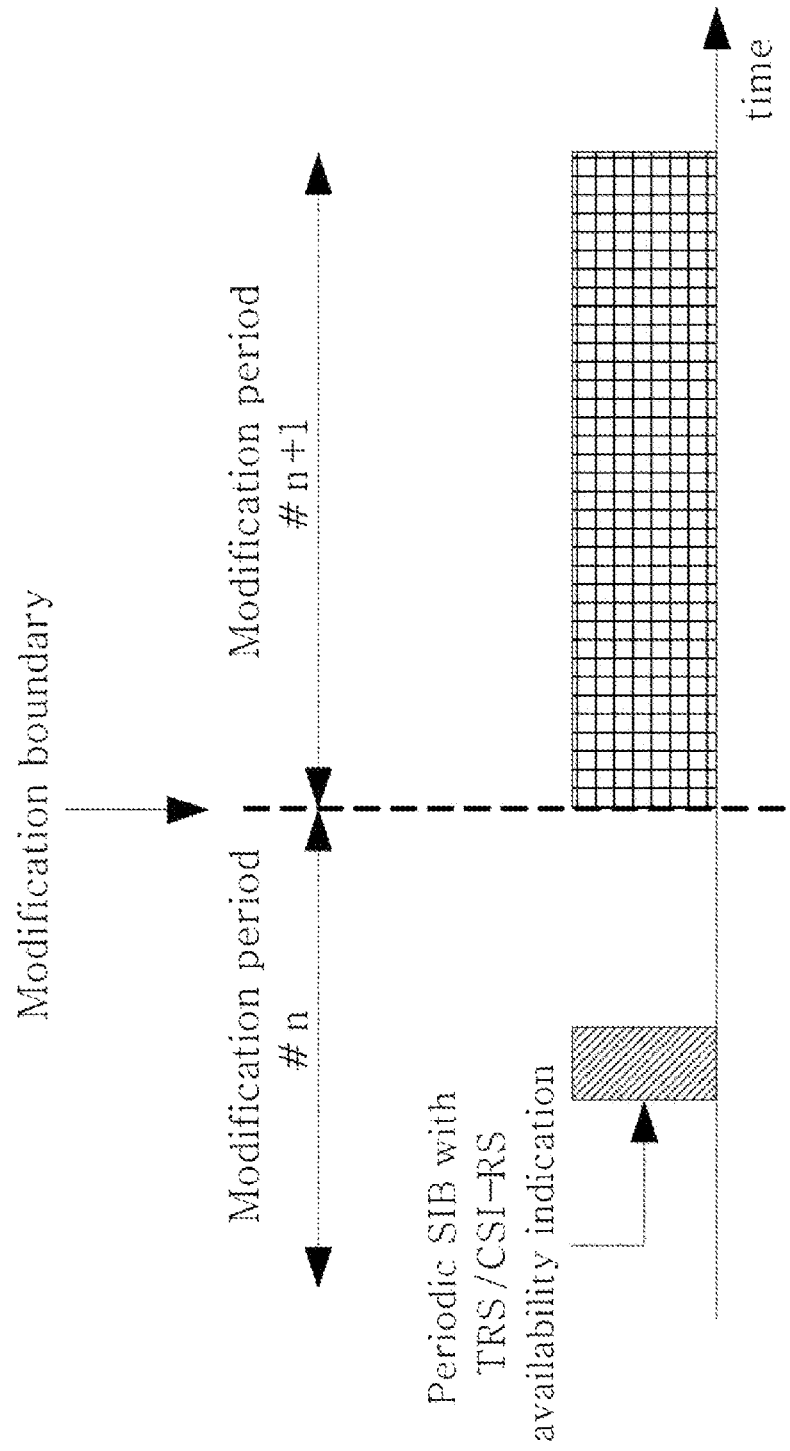

Referring to FIG. 27, there is an example that after a TRS/CSI-RS availability through an SIB has been transmitted and received in a specific modification period (e.g., a modification period #n), a UE assumes whether a TRS/CSI-RS is actually provided from a subsequent modification period (e.g., a modification period #n+1).

Figure 28:
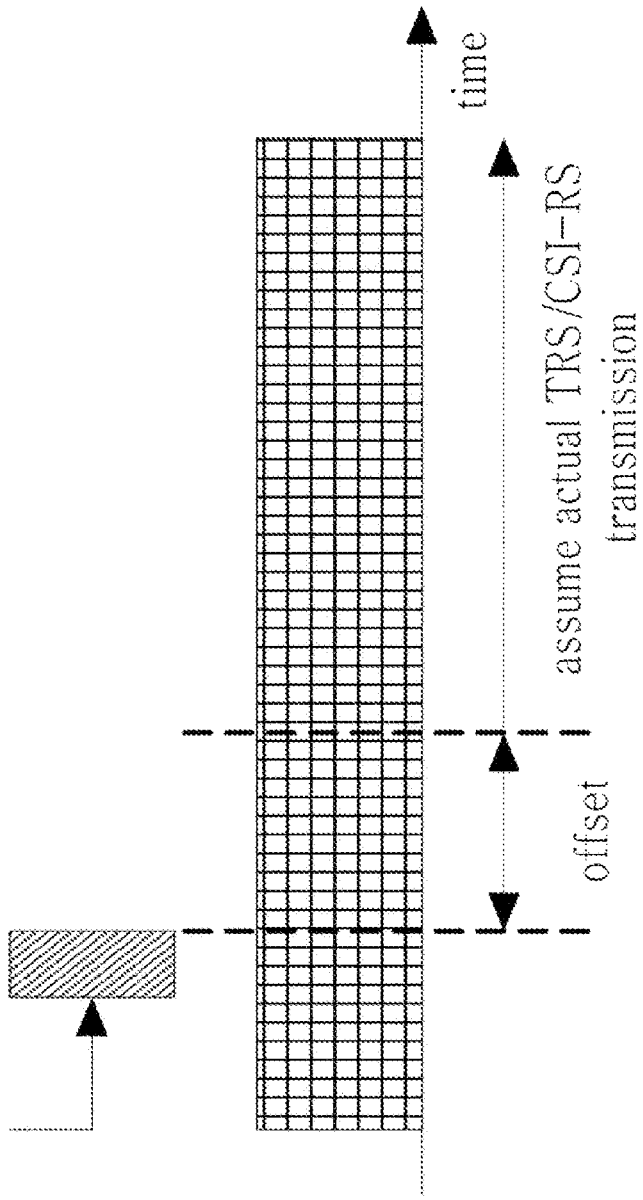

For example, if higher layer signaling indicating a TRS/CSI-RS availability is provided in an on-demand manner at the request of a UE, a TRS/CSI-RS availability start point may be determined based on a timing of receiving the higher layer signaling or a timing after a predetermined offset from the reception timing. For example, if higher layer signaling, indicating a TRS/CSI-RS availability corresponds to an SIB and the SIB is provided based on an on-demand at the request of a UE, the UE may apply an availability for a TRS/CSI-RS received through the SIB immediately or after a predetermined offset. Namely, this may be intended to immediately apply a TRS/CSI-RS availability assumption without unnecessary time delay when information on a TRS/CSI-RS availability that is already assumed by other UEs is provided to UEs requesting an on-demand-based SIB. In addition, considering a case of newly configuring a TRS/CSI-RS availability at the request of a UE, a section of a predetermined offset from a transmission/reception timing of an on-demand SIB to ensure that a base station is ready to transmit an appropriate TRS/CSI-RS. Referring to FIG. 28, it may be assumed that a TRS/CSI-RS, which is actually transmitted, is available for a UE after a specific offset from a timing of receiving an on-demand-based SIB.

A parameter of higher layer signaling may include a start timing of an availability related to a TRS/CSI-RS configuration. When higher layer signaling indicating a TRS/CSI-RS availability is transmitted through an SIB, a parameter may be included to indicate whether the availability related to the TRS/CSI-RS configuration provided by the SIB is applicable from a next modification period or immediately after a reception of the SIB. Namely, when a plurality of TRS/CSI-RS configurations are provided through an SIB and while there exists a TRS/CSI-RS of which transmission/reception is already in progress, if it is intended to support an additional TRS/CSI-RS availability from a next modification period, a TRS/CSI-RS that can be assumed by a UE at the timing of receiving the SIB may be used without delay and an availability related to a newly introduced TRS/CSI-RS configuration can be assumed from an agreed timing.

End Timing of Availability

When an availability related to a TRS/CSI-RS configuration is indicated by higher layer signaling, an indicated availability end point and conditions therefor are described. In general, broadcast data do not have corresponding feedback channels, and thus UEs are unable to inform a base station whether the informations are received. Therefore, if availability information related to a TRS/CSI-RS configuration is provided through higher layer signaling such as an SIB, the base station is unable to determine whether UEs expecting the corresponding information have received the corresponding information. In particular, while a UE assumes an availability for a TRS/CSI-RS configuration, if the UE does not clearly recognize an end point of the corresponding assumption, the UE may continue to assume the provision of a non-existing TRS/CSI-RS, which may cause significant performance degradation in an operation of the UE in idle/inactive mode. To solve this problem, we propose methods for a UE to stably transmit and receive a TRS/CSI-RS by reducing the ambiguity problem between a base station and a UE for an availability of a TRS/CSI-RS configuration.

As an example of determining an end point for an availability assumption of a TRS/CSI-RS, higher layer signaling used to provide a TRS/CSI-RS configuration is transmitted and received in a specific modification period, and if an availability in the specific modification period is assumed but there exists a TRS/CSI-RS configuration (hereinafter E-configuration) failing to be included in the transmitted/received higher layer signaling, a UE may assume an availability for the E-configuration until the corresponding modification period only and may not apply the availability for the E-configuration from a subsequent next modification period. For example, if higher layer signaling, which represents a TRS/CSI-RS availability, corresponds to an SIB and the SIB provides a complete list of TRS/CSI-RS configurations applied from a next modification period, a UE may assume an availability for TRS/CSI-RS configurations contained in the received SIB only but may not be able to perform an availability assumption for a configuration failing to be included in a currently received SIB from a next modification period. For another example, if higher layer signaling indicating a TRS/CSI-RS availability corresponds to an SIB and the SIB provides information for updating changes in a TRS/CSI-RS configuration list applied from a next modification period (e.g. a case that a TRS/CSI-RS configuration is provided using 'ToAddModlist' and 'TRSList' of TS 38.331spec A3.9), an availability assumption for a TRS/CSI-RS configuration, which is indicated to be released from a list through the SIB, may not be performed from a next modification period. Namely, when a base station intends to end a support for a TRS/CSI-RS configuration, it is advantageous in not causing separate signaling overhead by indicating an availability as well as instructing a release of the corresponding TRS/CSI-RS configuration. Moreover, it may be beneficial in terms of providing stability in UE operation by ensuring a predetermined section until a UE receives information on an availability termination and applies it.

Figure 29:
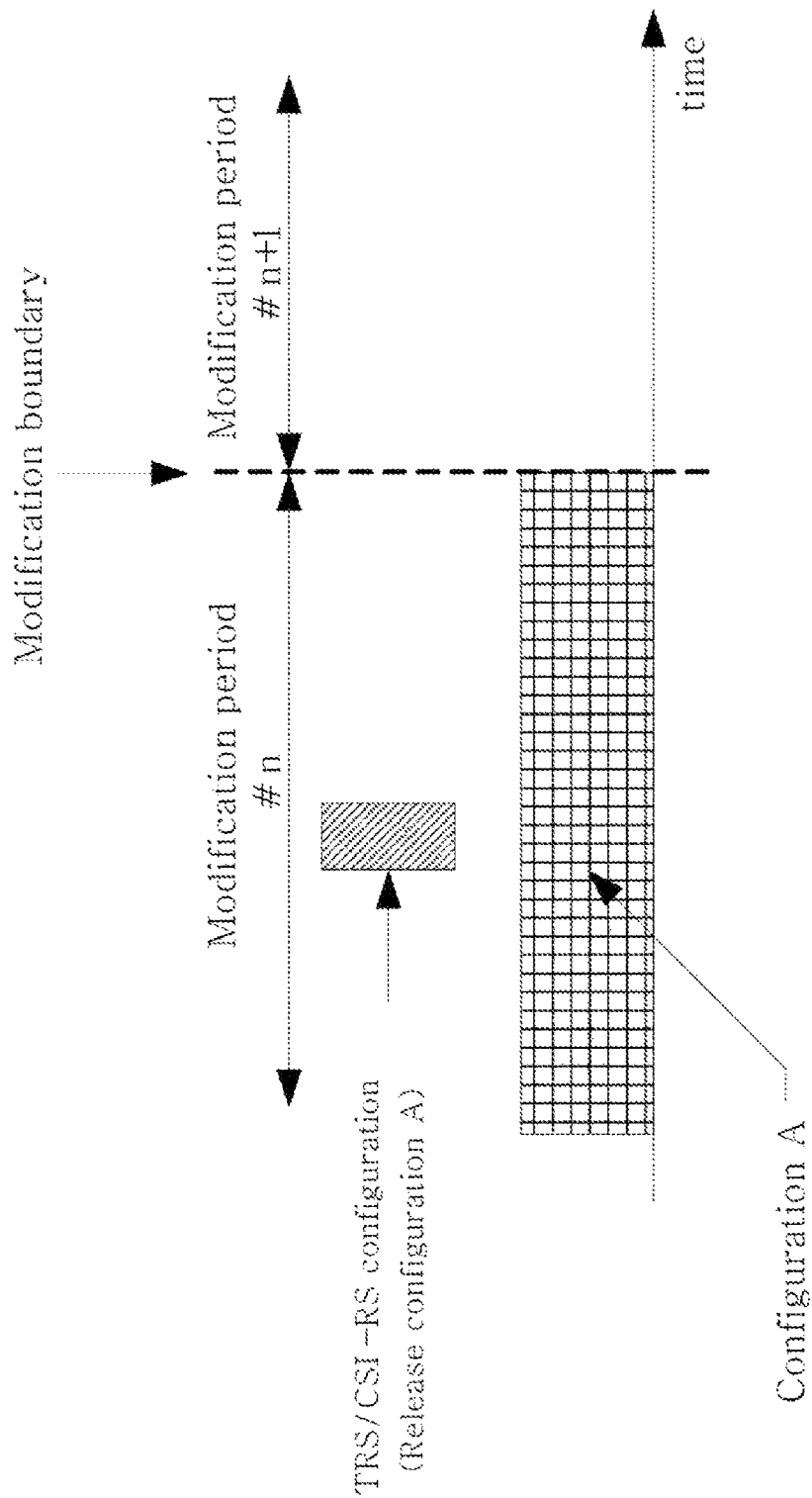

Referring to FIG. 29, higher layer signaling for releasing a specific TRS/CSI configuration (e.g., configuration A) is transmitted and received in a modification period #n, and a UE operates in a manner of assuming transmission and reception for the configuration A in a section up to the modification period #n but failing to perform the assumption from a next modification period (e.g., modification period #n+1).

For example, a UE operates a timer based on a timing (or interval) of receiving an availability indication related to a specific TRS/CSI-RS configuration, and after the end of the timer, an availability assumption related to the specific TRS/CSI-RS configuration may be stopped. A signaling for extending the timer may be received before the timer expires, and the UE may set the timer based on the last signaling. For example, higher layer signaling indicating a TRS/CSI-RS availability corresponds to an SIB, and the timer may be started based on a modification period in which a TRS/CSI-RS availability indication indicated by the SIB is received, or a modification period of starting an availability assumption. In this case, a length of the timer (e.g., an initial value) may be included in the SIB and indicated to the UE or may be a value predetermined by the standard. In this case, a base station can expect a gain in terms of NW signaling overhead because it can omit a separate signaling to terminate the TRS/CSI-RS availability assumption. In addition, in the case of the UE, it can expect a power saving gain because it can apply the termination of the indicated TRS/CSI-RS availability without an acquisition procedure of higher layer signaling.

In a situation where a timer for an availability related to a TRS/CSI-RS configuration is defined and operated as the proposed method, there may be a separate timer providing a validity for the corresponding TRS/CSI-RS configuration. For example, one of the methods proposed in Proposal 1 may be applied to the separate timer. In this case, when the timer for the availability has ended but the timer for the configuration has not ended, a UE may stop the availability assumption related to the TRS/CSI-RS configuration from a determined timing but may not release information about the configuration. This may be intended to reuse the existing configuration without generating signaling overhead for an additional releases and configuration, in preparation for a case that the corresponding TRS/CSI-RS configuration is not supported for a certain period after a predetermined timing but is likely to be reused later (e.g. a case that an availability may be indicated again through higher layer signaling or L1 signaling).

Figure 30:
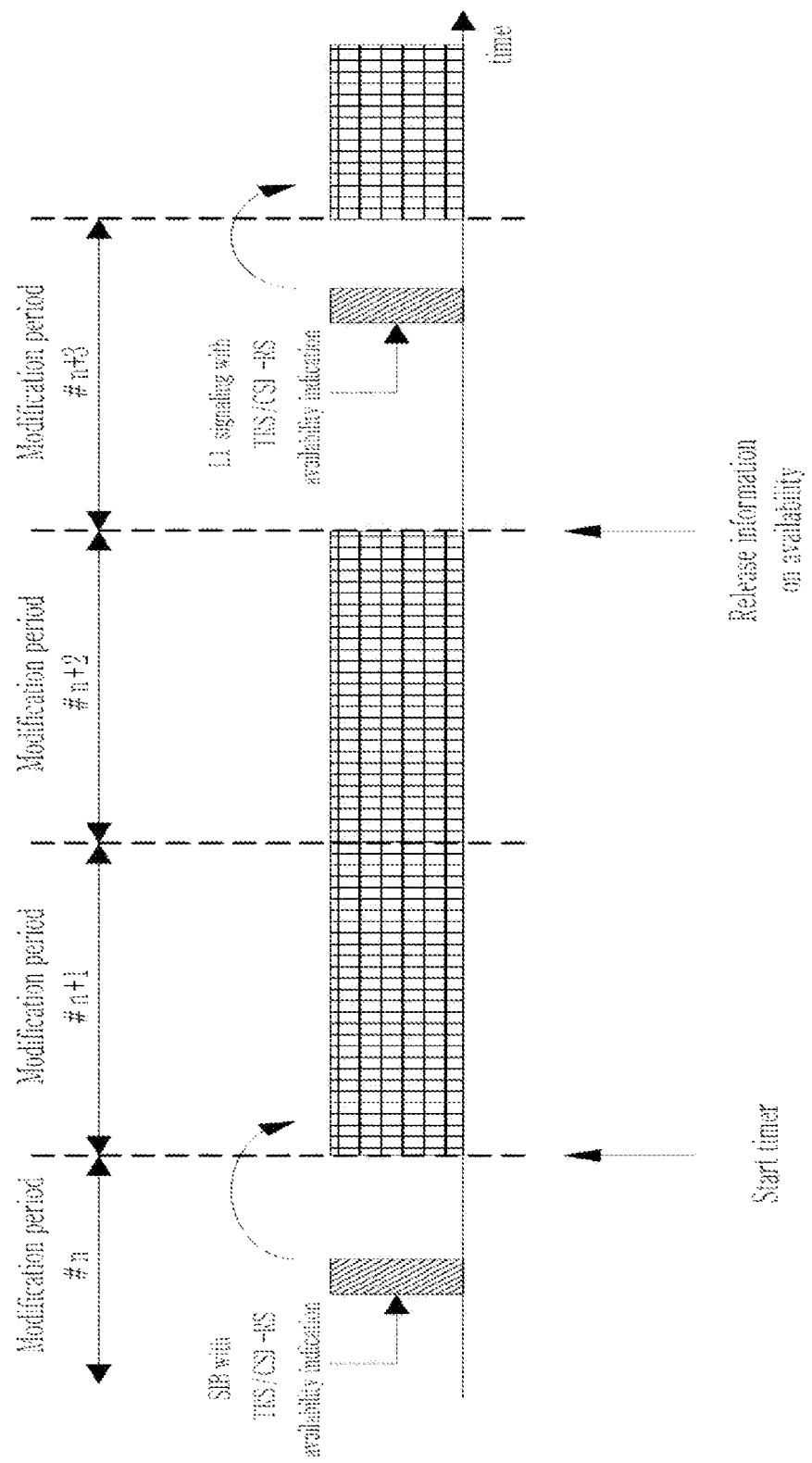

Referring to FIG. 30, a TRS/CSI-RS availability is indicated by an SIB in a modification period #n, and a timer is started from a start point of a modification period #n+1 where an application of the indicated availability indication is started. If a length of a determined timer is the length of two modification periods, a UE may stop a TRS/CSI-RS availability assumption at a timing of ending a modification period #n+2 without a separate signaling. Thereafter, if information on an availability for the terminated configuration is provided by other signaling, the UE may apply a TRS/CSI-RS availability assumption in an indicated period.

Proposal 4: Configuration Condition of Validity Duration

In a configuration process of a validity duration (e.g., a section where a UE may assume that a TRS/CSI-RS is transmitted), a method of determining a length of an appropriate validity duration in consideration of UE's properties will be described. A of a validity duration may be configured not to exceed the maximum size of a reference sequence in a time domain that a UE may classify. Alternatively, a configured length of a validity duration may be interpreted differently according to UE's capability.

In a wireless communication system, a reference sequence on a time domain may be defined and used for the purpose of matching a reference timing and validity period of a transmission/reception operation between a base station and a UE. For example, in wireless communication systems such as LTE and NR, a System Frame Number (SFN) with a range of 0 to 1023 is defined and used. In the case of a special UE, Hyper-SFN (H-SFN) is defined for the purpose of express abnormalities of a section that can be expressed as an SFN. Start and end points of a validity duration of a TRS/CSI-RS may also be expressed using such a reference sequence on a time domain such as an SFN.

For example, at the 3GPP RAN1 #107 conference, the contents in the following Table 5 was agreed.

TABLE 5

For the validity duration configured by higher layer at least for paging PDCCH based L1 Availability Indication, support
- time unit is one default paging cycle,
- applicable values: {1, 2, 4, 8, 16, 32, [64], [128], [256],[512]}
When the validity duration is not configured, UE assumes a default time duration to be 2 default paging cycle(s):

According to the agreement of Table 5, a UE may configure a size of a validity duration with a length of a multiple of a default paging cycle based on Rel-17 NR. A size of the default paging cycle is configured by a base station, and one of the values of {rf32, rf64, rf128, rf256} may be used in the current 3GPP NR standard. In this case, rf32, rf64, rf128, and rf256 refer to 32 radio frames, 64 radio frames, 128 radio frames, and 256 radio frames, respectively. In addition, the applicable value means a parameter that determines a size of the multiple.

As one of the detailed embodiments, when a configuration is performed to specify a validity duration of a TRS/CSI-RS supported by Rel-17 NR, a UE may expect that the value of 'default paging cycle*applicable value' does not exceed a maximum range (e.g., 1024 radio frames) of an SFN. For example, values of the applicable value that can be indicated by a base station according to a length of the default paging cycle may be determined as shown in Table 5. Table 6 shows a case in which a maximum length of a validity duration that can be configured for each default paging cycle becomes 1024 radio frames. Those skilled in the art may understand that it can be applied to other combinations of the applicable values in addition to the examples in Table 6. The base station may select a value of the default paging cycle and a value the applicable value so that the value of 'default paging cycle*applicable value' does not exceed the maximum range (e.g., 1024 radio frame) of the SFN and notify it to the UE.

TABLE 6

| Default paging cycle | Applicable value |
| --- | --- |
| 32 radio frame | 1, 2, 4, 8, 16, 32 |
| 64 radio frame | 1, 2, 4, 8, 16 |
| 128 radio frame | 1, 2, 4, 8 |
| 256 radio frame | 1, 2, 4 |

As a specific example, when a configuration is performed to specify a validity duration of a TRS/CSI-RS supported by Rel-17 NR, a UE may sets a maximum SFN length, which can be processed by the UE according to UE's capability, as a maximum validity duration. If the validity duration calculated by 'default paging cycle*applicable value' is longer than a length of the maximum validity duration, the UE may determine/set the maximum validity duration as an indicated validity duration. For example, in the case of a UE that classifies only the range of SFN (e.g., a UE failing to have capability for H-SFN), a size of the maximum validity duration may be set to be 1024 radio frames. In the case of a UE that can classify the range of H-SFN (or a UE to which an operation for the range of the H-SFN is indicated), a size of the maximum validity duration (e.g., eDRX cycle longer than 1024 radio frames) may be determined as $1042^2$ radio frames or have no limitation. For example, if the sizes of the default paging cycle and the applicable value configured by the base station are X and Y, respectively, the size of the validity duration determined by the UE may become a value of min (maximum validity duration, X*Y). In addition to capability for SFN and H-SFN, a validity duration may be determined based on other types of capability. The base station may select a value of a default paging cycle and a value of an applicable value and provide them to the UE.

The proposed methods limit or interpret an indication range of a validity duration to a range that a UE can estimate, so that the UE can clearly understand a time interval that the UE can expect to receive a TRS/CSI-RS therein, and provide an advantageous effect for a base station to perform an actual transmission of the TRS/CSI-RS based on the understanding thereof. If the proposed method is not used, the UE may be forced to calculate a validity duration for a time interval (e.g. 1024 radio frames in case of an H-SFN non-capable UE) beyond UE's capability, which may increase the implementation complexity of the UE. If the implementation complexity is not increased, it may cause a problem of misleading an end point.

Proposal 5: Separate TRS/CSI-RS Configuration Update Procedure

A UE may receive change notification information on a TRS/CSI-RS configuration through DCI. If the change notification information indicates a change, the UE may perform and apply an SI update process related to the TRS/CSI-RS configuration within a modification period including a DCI reception timing. The DCI may be, for example, a paging DCI. If the paging DCI is used, the change notification information may be expressed by bits of a short message field, for example, and may typically include bits assigned and used separately from bits used for other general SI update notification purposes. For convenience, the paging DCI is illustrated, but it may be understood by those skilled in the art that the same function may be included in other signals or channels (e.g. PEI) and applied even if there is no separate explanation.

For example, if a UE successfully detects a paging DCI in a PO located in a specific modification period and confirms change notification information on a new TRS/CSI-RS configuration through a bit that provides SI update indication information on a TRS/CSI-RS configuration in the detected paging DCI, the UE may progress an SI update procedure for receiving an SIB providing the TRS/CSI-RS configuration in a modification period to which the PO having the DCI detected therefrom. For example, the SI update procedure may include a reception procedure of SIB1 and a reception procedure of SIB-X (e.g., an SIB that provides a TRS/CSI-RS configuration).

If there exists TRS/CSI-RS availability information indicated before a modification period (hereinafter a modification period C) to which the PO having the DCI (e.g., a paging DCI providing SI update indication information on a TRS/CSI-RS configuration) detected therefrom belongs and the entire or part of an indicated TRS/CSI-RS available duration is included in the modification period C, the UE may assume that the TRS/CSI-RS available duration will be maintained in the modification period C.

If the UE receives a DCI indicating a TRS/CSI-RS availability at the location of the modification period C, the UE may assume a TRS/CSI-RS availability based on a TRS/CSI-RS configuration configured prior to the location of the modification period C. In this case, a timing of ending an available duration may not exceed an end timing of the modification period C. This may be intended for the UE to prevent malfunction of UEs (e.g., if failing in detection of paging DCI or receiving PEI having no SI update indication information included therein before detecting the paging DCI) failing to confirm the paging DCI indicating an SI update, even at the location of the modification period C.

Figure 31:
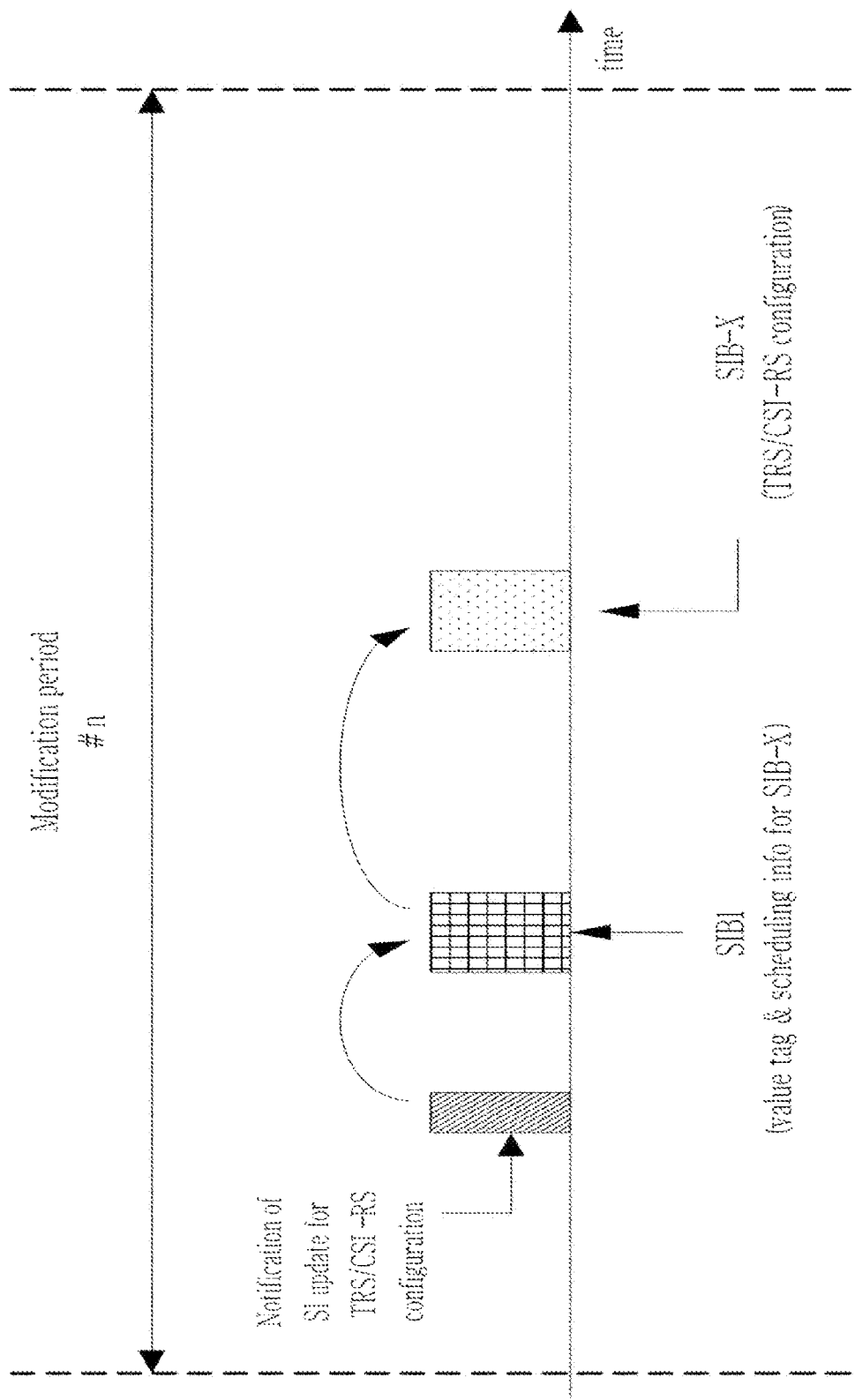

Referring to FIG. 31, a UE may receive information on whether to update a TRS/CSI-RS configuration through a paging DCI, and in this case, the UE performs an SI update procedure to directly obtain a TRS/CSI-RS configuration within a modification period including the paging DCI. For example, by receiving an SIB1, the UE may check a value tag for the TRS/CSI-RS configuration and obtain scheduling information on an SIB-X (e.g., an SIB providing a TRS/CSI-RS configuration) if determining that a new TRS/CSI-RS configuration need to be obtained (e.g., a case of confirming that a value different from that of a value tag stored in the UE is indicated). Thereafter, the UE may receive the SIB-X according to the obtained scheduling information and update information on the TRS/CSI-RS configuration. The SI update procedure described in the above example is only an example, and the proposed method is applicable to an SI update procedure of another type that can be performed within a modification period including a timing at which the UE receives a DCI indicating whether to update a TRS/CSI-RS configuration.

Figure 32:
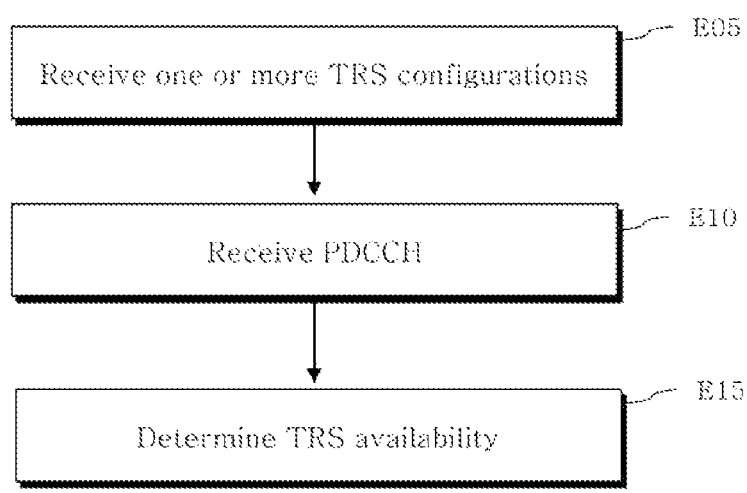
FIG. 32 is a flowchart illustrating a method of transmitting a signal by a UE according to an embodiment of the present disclosure.

FIG. 32 illustrates a flow of a signal receiving method of a UE according to an embodiment of the present disclosure. FIG. 32 may be understood as an implementation example of at least a part of the above-described embodiments, and the above description may be referred to if necessary.

A UE may receive one or more Tacking Reference Signal (TRS) configurations for a Radio Resource Control (RRC) inactive mode or an RRC idle mode (E05). Each of the one or more TRS configurations may be received in each modification period related to a system information update.

The UE may receive Physical Link Control Channel (PDCCH) carrying Downlink Control Information (DCI) in the RRC inactive mode or the RRC idle mode (E10). The DCI may include paging-DCI for scheduling a paging message or Paging Early Indication-DCI (PEI-DCI) for early indicating whether monitoring of the paging DCI is required for the UE in a corresponding PO.

The UE may determine a TRS availability related to a specific one of the one or more TRS configurations based on the DCI (E15).

The DCI may include a field indicating the TRS availability. The UE may determine a time interval where the field indicating the TRS availability to be applied and the specific TRS configuration among the one or more TRS configurations based on a time resource in which the PDCCH carrying the DCI is received.

The UE may determine a first TRS configuration associated with a first modification period as the specific TRS configuration based on that the time resource in which the PDCCH carrying the DCI is received belongs to the first modification period. The UE may assume that a TRS related to the first TRS configuration is available during the time interval where the field indicating the TRS availability to be applied. Even if at least a part of the time interval belongs to a second modification period following the first modification period, the UE may assume that the TRS related to the first TRS configuration is available for the entire time interval where the field indicating the TRS availability to be applied. Although the second modification period is associated with the second TRS configuration different from the first TRS configuration, the UE may assume that the TRS related to the first TRS configuration is available for the entire time interval where the field indicating the TRS availability to be applied.

When the time interval where the field indicating the TRS availability to be applied and the time resource having the PDCCH received therein belong to the same modification period, while the corresponding TRS configuration associated with the same modification period is not received by the UE, the UE may defer an application of the TRS availability indicated by the DCI until the corresponding TRS configuration is received. After completing an update of system information including the corresponding TRS configuration in the same modification period, the UE may start the application of the TRS availability indicated by the DCI.

Based on receiving information indicating that the system information indicating to update system information, the UE may complete a system information update including a TRS configuration within a corresponding modification period in which the information indicating to update the system information is received.

The PDCH may be received based on at least one of Radio Network Temporary Identifiers (RNTIs) configured for the UE, and the at least one RNTI may include a paging-RNTI (P-RNTI).

Figure 33:
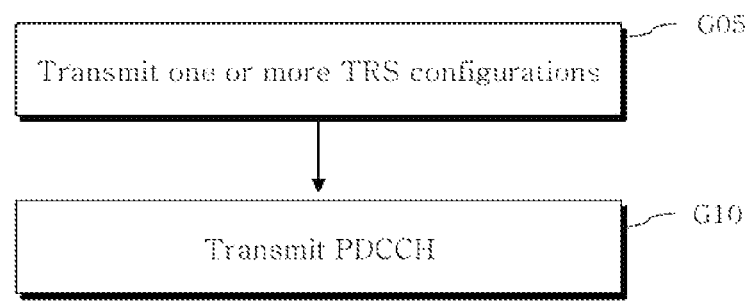
FIG. 33 is a flowchart illustrating a method of transmitting a signal by a BS according to an embodiment of the present disclosure.

FIG. 33 is a flowchart illustrating a signal transmitting method of a base station according to an embodiment of the present disclosure. FIG. 33 may be understood as an implementation example of at least a part of the above-described embodiments, and the above description may be referred to as necessary.

A base station may transmit one or more Tracking Reference Signal (TRS) configurations for a Radio Resource Control (RRC) inactive mode or an RRC idle mode of a UE (G05). Each of the one or more TRS configurations may be transmitted in each modification period related to a system information update.

The base station may transmit Physical Downlink Control Channel (PDCCH) carrying Downlink Control Information (DCI) in the RRC inactive mode or the RRC idle mode of the UE (G10). The DCI may be paging-DCI for scheduling a paging message or Paging Early Indication-DCI (PEI-DCI) for early indication of whether monitoring of the paging DCI is required for the UE in a corresponding PO. The DCI may include a field indicating a TRS availability related to a specific TRS configuration among the one or more TRS configurations.

A time interval where the field indicating the TRS availability to be applied and the specific TRS configuration among the one or more TRS configurations may be determined based on a time resource in which the PDCCH carrying the DCI is transmitted.

When the time resource in which the PDCCH carrying the DCI is transmitted belongs to a first modification period A first TRS configuration associated with the first modification period may be determined as the specific TRS configuration. A TRS related to the first TRS configuration may be available during the time interval where the field indicating the TRS availability to be applied. Even if at least a part of the time interval belongs to a second modification period following the first modification period, the TRS related to the first TRS configuration may be available for the entire time interval where the field indicating the TRS availability to be applied. Although the second modification period is associated with the second TRS configuration different from the first TRS configuration, the TRS related to the first TRS configuration may be available for the entire time interval where the field indicating the TRS availability to be applied.

When the time interval where the field indicating the TRS availability to be applied and the time resource having the PDCCH transmitted therein belong to the same modification period, while the corresponding TRS configuration associated with the same modification period is not transmitted to the UE, the an application of the TRS availability indicated by the DCI may be deferred until the corresponding TRS configuration is transmitted. After completing an update of system information including the corresponding TRS configuration in the same modification period, the application of the TRS availability indicated by the DCI may be started.

Based on transmitting information indicating that the system information indicating to update system information, it is able to complete a system information update including a TRS configuration within a corresponding modification period in which the information indicating to update the system information is received.

The PDCH may be transmitted based on at least one of Radio Network Temporary Identifiers (RNTIs) configured for the UE, and the at least one RNTI may include a paging-RNTI (P-RNTI).

Figure 34:
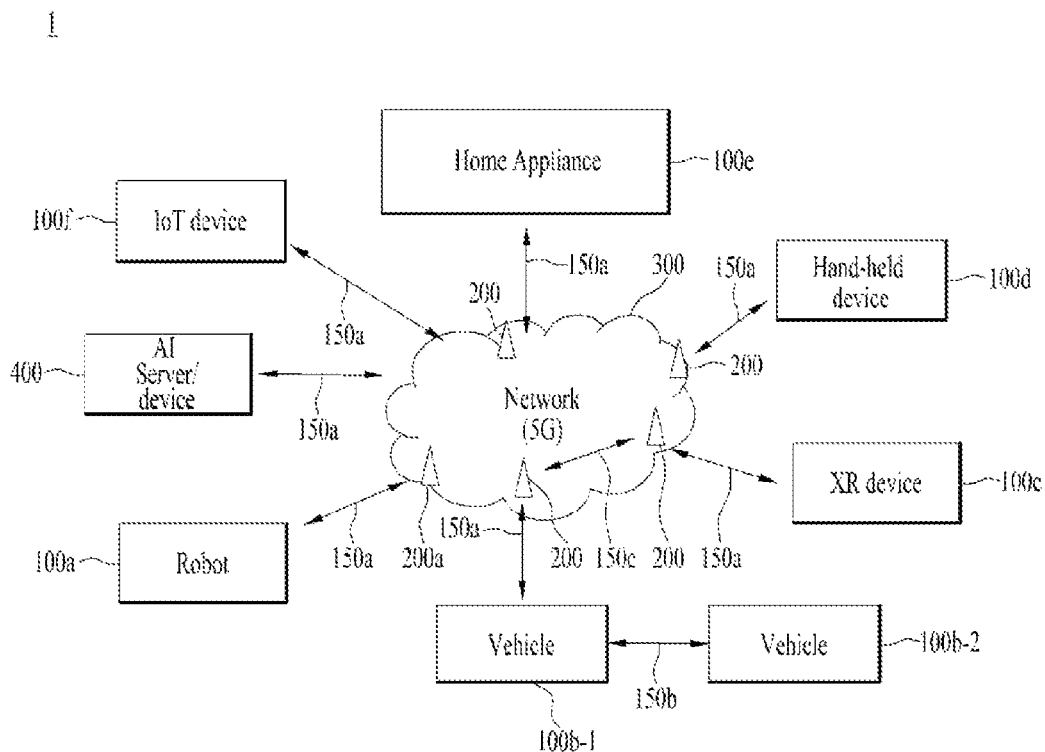
FIG. 34 to FIG. 37 illustrate an example of a communication system 1 and wireless devices applicable to the present disclosure.

FIG. 34 illustrates a communication system 1 applied to the present disclosure.

Referring to FIG. 34, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IOT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 35:
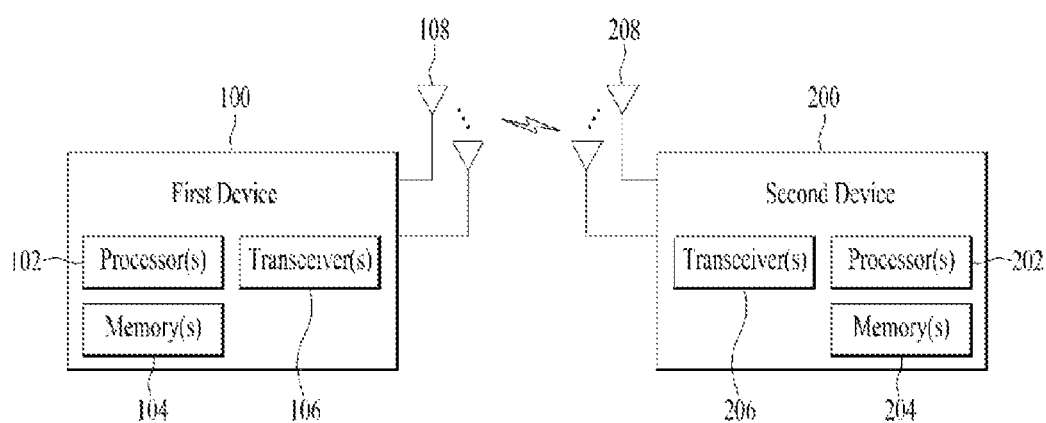

FIG. 35 illustrates wireless devices applicable to the present disclosure.

Referring to FIG. 35, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 34.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 36:
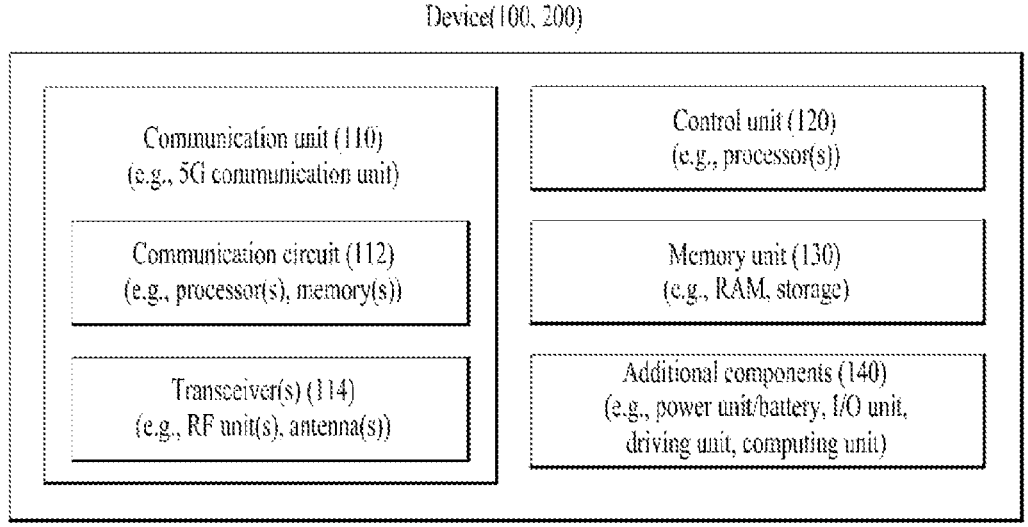

FIG. 36 illustrates another example of a wireless device applied to the present disclosure. The wireless device may be implemented in various forms according to a use-case/service (refer to FIG. 34).

Referring to FIG. 36, wireless devices 100 and 200 may correspond to the wireless devices 100 and 200 of FIG. 35 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 35. For example, the transceiver(s) 114 may include the one or more transceivers 106 and 206 and/or the one or more antennas 108 and 208 of FIG. 35. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 34), the vehicles (100b-1 and 100b-2 of FIG. 34), the XR device (100c of FIG. 34), the hand-held device (100d of FIG. 34), the home appliance (100e of FIG. 34), the IoT device (100f of FIG. 34), a digital broadcast terminal, a hologram device, a public safety device, an MTC device, a medicine device, a fintech device (or a finance device), a security device, a climate/environment device, the AI server/device (400 of FIG. 34), the BSs (200 of FIG. 34), a network node, etc. The wireless device may be used in a mobile or fixed place according to a use-example/service.

In FIG. 36, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 37:
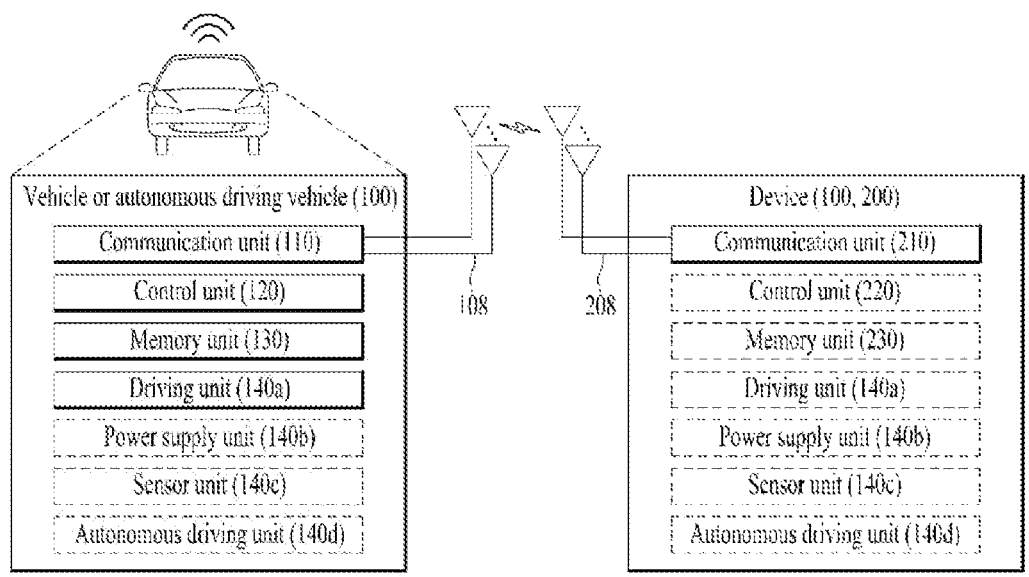

FIG. 37 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 37, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 36, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 38:
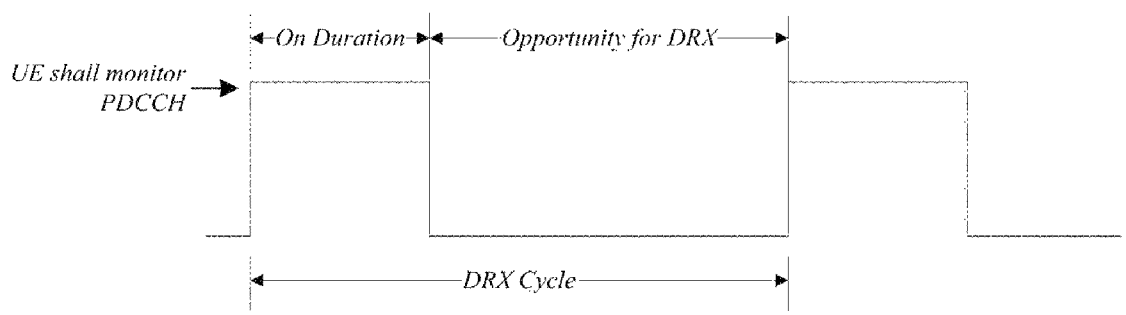
FIG. 38 illustrates an exemplary discontinuous reception (DRX) operation applicable to the present disclosure.

FIG. 38 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 38, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 7

| | Type of signals | UE procedure |
| --- | --- | --- |
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.
  Value of drx-OnDurationTimer: defines the duration of the starting period of the DRX cycle.
  Value of drx-InactivityTimer: defines the duration of a time period during which the UE is awake after a PDCCH occasion in which a PDCCH indicating initial UL or DL data has been detected
  Value of drx-HARQ-RTT-TimerDL: defines the duration of a maximum time period until a DL retransmission is received after reception of a DL initial transmission.
  Value of drx-HARQ-RTT-TimerDL: defines the duration of a maximum time period until a grant for a UL retransmission is received after reception of a grant for a UL initial transmission.
  drx-LongCycleStartOffset: defines the duration and starting time of a DRX cycle.
  drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

What is claimed is:

1. A method of receiving a signal by a user equipment in a wireless communication system, the method comprising:
  receiving one or more Tracking Reference Signal (TRS) configurations for a Radio Resource Control (RRC) inactive mode or an RRC idle mode;
  receiving a Physical Downlink Control Channel (PDCCH) carrying Downlink Control Information (DCI) in the RRC inactive mode or the RRC idle mode; and
  determining a TRS availability related to a specific TRS configuration among the one or more TRS configurations,
  wherein each of the one or more TRS configurations is received in each modification period related to a system information update,
  wherein the DCI is paging-DCI for scheduling a paging message or Paging Early Indication-DCI (PEI-DCI) for early indicating whether a monitoring of the paging-DCI is required for the user equipment in a corresponding PO and the DCI includes a field indicating a TRS availability, and
  wherein the user equipment determines a time interval where the field indicating the TRS availability to be applied and the specific TRS configuration among the one or more TRS configurations based on a time resource in which the PDCCH carrying the DCI is received.

2. The method of claim 1, wherein based on that the time resource in which the PDCCH carrying the DCI is received belongs to a first modification period, the user equipment determines a first TRS configuration associated with the first modification period as the specific TRS configuration.

3. The method of claim 2, wherein the user equipment assumes that a TRS related to the first TRS configuration is available during the time interval where the field indicating the TRS availability to be applied.

4. The method of claim 3, wherein although at least a part of the time interval belongs to a second modification period subsequent to the first modification period, the user equipment assumes that the TRS related to the first TRS configuration is available for the entire time interval where the field indicating the TRS availability to be applied.

5. The method of claim 4, wherein although the second modification period is associated with the second TRS configuration different from the first TRS configuration, the user equipment assumes that the TRS related to the first TRS configuration is available for the entire time interval to which the field indicating the TRS configuration will be applied.

6. The method of claim 1, wherein when the time interval where the field indicating the TRS availability to be applied and the time resource having the PDCCH received therein belong to a same modification period, while a corresponding TRS configuration associated with the same modification period is not received by the user equipment yet, the user equipment defers an application of the TRS availability indicated by the DCI until the corresponding TRS configuration is received.

7. The method of claim 6, wherein after completing an update of system information including the corresponding TRS configuration in the same modification period, the user equipment starts the application of the TRS availability indicated by the DCI.

8. The method of claim 1, wherein based on receiving information indicating to update the system information, the user equipment completes the system information update including the TRS configuration in a corresponding modification period in which the information indicating to update the system information is received.

9. The method of claim 1, wherein the PDCCH is received based on at least one of Radio Network Temporary Identifiers configured for the user equipment and wherein the at least one RNTI includes a Paging-RNTI (P-RNTI).

10. A processor-readable recording medium, comprising a program recorded therein to perform the method disclosed in claim 1.

11. A device for wireless communication, comprising:
a memory storing instructions therein; and
a processor performing an operation by executing the instructions, the operation comprising:
   receiving one or more Tracking Reference Signal (TRS) configurations for a Radio Resource Control (RRC) inactive mode or an RRC idle mode;
   receiving a Physical Downlink Control Channel (PDCCH) carrying Downlink Control Information (DCI) in the RRC inactive mode or the RRC idle mode; and
   determining a TRS availability related to a specific TRS configuration among the one or more TRS configurations,
wherein each of the one or more TRS configurations is received in each modification period related to a system information update,
wherein the DCI is paging-DCI for scheduling a paging message or Paging Early Indication-DCI (PEI-DCI) for early indicating whether a monitoring of the paging-DCI is required for the user equipment in a corresponding PO and the DCI includes a field indicating a TRS availability, and
wherein the processor determines a time interval where the field indicating the TRS availability to be applied and the specific TRS configuration among the one or more TRS configurations based on a time resource in which the PDCCH carrying the DCI is received.

12. The device of claim 11, comprising an Application Specific Integrated Circuit (ASIC) or a digital signal processor.

13. The device of claim 11, comprising a User Equipment (UE) operating in a $3^{rd}$ Generation Partnership Project (3GPP) based wireless communication system.

14. A method of transmitting a signal by a base station in a wireless communication system, the method comprising:
transmitting one or more Tracking Reference Signal (TRS) configurations for a Radio Resource Control (RRC) inactive mode or an RRC idle mode of a user equipment; and
transmitting a Physical Downlink Control Channel (PDCCH) carrying Downlink Control Information (DCI) in the RRC inactive mode or the RRC idle mode of the user equipment,
wherein each of the one or more TRS configurations is transmitted in each modification period related to a system information update,
wherein the DCI is paging-DCI for scheduling a paging message or Paging Early Indication-DCI (PEI-DCI) for early indicating whether a monitoring of the paging-DCI is required for the user equipment in a corresponding PO and the DCI includes a field indicating a TRS availability related to a specific TRS configuration among the one or more TRS configurations, and
wherein a time interval where the field indicating the TRS availability to be applied and the specific TRS configuration among the one or more TRS configurations are determined based on a time resource in which the PDCCH carrying the DCI is transmitted.

15. A base station for wireless communication, comprising:
a transceiver; and
a processor controlling the transceiver to transmit one or more Tracking Reference Signal (TRS) configurations for a Radio Resource Control (RRC) inactive mode or an RRC idle mode of a user equipment and transmit a Physical Downlink Control Channel (PDCCH) carrying Downlink Control Information (DCI) in the RRC inactive mode or the RRC idle mode of the user equipment,
wherein each of the one or more TRS configurations is transmitted in each modification period related to a system information update,
wherein the DCI is paging-DCI for scheduling a paging message or Paging Early Indication-DCI (PEI-DCI) for early indicating whether a monitoring of the paging-DCI is required for the user equipment in a corresponding PO and the DCI includes a field indicating a TRS availability related to a specific TRS configuration among the one or more TRS configurations, and
wherein a time interval where the field indicating the TRS availability to be applied and the specific TRS configuration among the one or more TRS configurations are determined based on a time resource in which the PDCCH carrying the DCI is transmitted.

* * * * *